(12) United States Patent
Benjamin et al.

(10) Patent No.: US 12,077,046 B2
(45) Date of Patent: Sep. 3, 2024

(54) INTERACTIVE SAFETY SYSTEM FOR VEHICLES

(71) Applicant: Focused Technology Solutions, Inc., Hackettstown, NJ (US)

(72) Inventors: Timothy J. Benjamin, Newnan, GA (US); Peter M. Bartek, Ledgewood, NJ (US); Jon A. Preston, Atlanta, GA (US); Jeff Chastine, Atlanta, GA (US); Joseph L. Calabrese, Fayetteville, NY (US); Corey Dash, Mount Arlington, NJ (US)

(73) Assignee: Railserve, Inc., Atlanta, GA (US)

( * ) Notice: Subject to any disclaimer, the term of this patent is extended or adjusted under 35 U.S.C. 154(b) by 0 days.

(21) Appl. No.: 17/734,699

(22) Filed: May 2, 2022

(65) Prior Publication Data
US 2023/0052890 A1 Feb. 16, 2023

Related U.S. Application Data

(63) Continuation of application No. 17/232,068, filed on Apr. 15, 2021, now Pat. No. 11,318,886, which is a
(Continued)

(51) Int. Cl.
*B60K 35/00* (2024.01)
*B60K 37/00* (2006.01)
(Continued)

(52) U.S. Cl.
CPC .............. *B60K 35/00* (2013.01); *B60K 37/00* (2013.01); *B60Q 1/525* (2013.01); *B60Q 5/006* (2013.01);
(Continued)

(58) Field of Classification Search
CPC .............. B60R 1/002; B60R 2300/105; B60R 300/802; B60R 300/8093; G06T 7/292;
(Continued)

(56) References Cited

U.S. PATENT DOCUMENTS 6,593,960 B1 7/2003 Sugimoto et al.
6,642,840 B2 11/2003 Lang et al.
(Continued)

FOREIGN PATENT DOCUMENTS

JP 2008-062666 * 3/2008
WO WO 2019/134845 7/2019

*Primary Examiner* — Mishawn N. Hunter
(74) *Attorney, Agent, or Firm* — Arnold & Porter Kaye Scholer

(57) ABSTRACT

An interactive vehicle safety system having capabilities to improve peripheral vision, provide warning, and improve reaction time for operators of vehicles. For example, the interactive vehicle safety system may have capabilities for portraying objects, which are being blocked by any of the structural pillars and/or mirrors of a vehicle (such as a truck, van, train, etc.). The interactive vehicle safety system disclosed may comprise one or more image capturing devices (such as camera, sensor, laser), distance and object sensors (such as ultrasonic sensor, LIDAR radar sensor, photoelectric sensor, and infrared sensor), a real-time image processing of an object, and one or more display systems (such as LCD or LED displays). The interactive vehicle safety system may give a seamless 360-degree front panoramic view to a driver.

20 Claims, 24 Drawing Sheets

Related U.S. Application Data continuation of application No. 16/930,974, filed on Jul. 16, 2020, now Pat. No. 10,981,507.

(60) Provisional application No. 62/932,188, filed on Nov. 7, 2019.

(51) Int. Cl.

| | | |
|---|---|---|
| *B60Q 1/50* | (2006.01) | |
| *B60Q 5/00* | (2006.01) | |
| *B60R 1/00* | (2022.01) | |
| *B60R 1/24* | (2022.01) | |
| *B60R 1/26* | (2022.01) | |
| *B60R 1/31* | (2022.01) | |
| *B60R 16/023* | (2006.01) | |
| *G06T 7/292* | (2017.01) | |
| *H04N 5/445* | (2011.01) | |
| *H04N 23/90* | (2023.01) | |
| *B60K 35/23* | (2024.01) | |
| *B60K 35/26* | (2024.01) | |
| *B60K 35/28* | (2024.01) | |

(52) U.S. Cl.
CPC ............... *B60R 1/002* (2013.01); *B60R 1/24* (2022.01); *B60R 1/26* (2022.01); *B60R 1/31* (2022.01); *B60R 16/0232* (2013.01); *G06T 7/292* (2017.01); *H04N 5/445* (2013.01); *H04N 23/90* (2023.01); *B60K 35/23* (2024.01); *B60K 35/26* (2024.01); *B60K 35/28* (2024.01); *B60K 2360/178* (2024.01); *B60Q 2400/50* (2013.01); *B60R 2300/105* (2013.01); *B60R 2300/202* (2013.01); *B60R 2300/205* (2013.01); *B60R 2300/301* (2013.01); *B60R 2300/802* (2013.01); *B60R 2300/8093* (2013.01); *G06T 2207/30241* (2013.01); *G06T 2207/30261* (2013.01)

(58) Field of Classification Search
CPC .......... G06T 2207/30241; G06T 2207/30261; H04N 23/90; H04N 5/445; B60K 35/00; B60K 37/00
See application file for complete search history.

(56) References Cited

U.S. PATENT DOCUMENTS

| | | | |
|---|---|---|---|
| 6,697,184 | B1 | 2/2004 | Keller et al. |
| 7,110,021 | B2 | 9/2006 | Nobori et al. |
| 7,266,220 | B2 | 9/2007 | Sato et al. |
| 7,353,086 | B2 | 4/2008 | Ennis |
| 7,432,799 | B2 | 10/2008 | Tsuboi |
| 10,161,720 | B2 | 12/2008 | Banerjee et al. |
| 7,486,175 | B2 | 2/2009 | Suzuki et al. |
| 7,511,734 | B2 | 3/2009 | Ozaki |
| 7,564,479 | B2 | 7/2009 | Schedivy |
| 7,592,928 | B2 | 9/2009 | Chinomi et al. |
| 8,058,980 | B2 | 11/2011 | Yanagi et al. |
| 8,130,270 | B2 | 3/2012 | Ito et al. |
| 8,154,418 | B2 | 4/2012 | Peterson et al. |
| 8,345,095 | B2 | 1/2013 | Oizumi et al. |
| 8,547,298 | B2 | 10/2013 | Szczerba et al. |
| 8,655,019 | B2 | 2/2014 | Kamiyama |
| 8,733,938 | B2 | 5/2014 | Sachdev et al. |
| 8,749,404 | B2 | 6/2014 | Augst |
| 8,854,197 | B2 | 10/2014 | Ikeda et al. |
| 8,976,247 | B1 | 3/2015 | Kamer et al. |
| 8,977,008 | B2 | 3/2015 | Camilleri et al. |
| 9,041,806 | B2 | 5/2015 | Baur et al. |
| 9,102,269 | B2 | 8/2015 | Waite et al. |
| 9,126,533 | B2 | 9/2015 | Kubota et al. |
| 9,238,434 | B2 | 1/2016 | Eder et al. |
| 9,290,128 | B2 | 3/2016 | Pan |
| 9,349,300 | B2 | 5/2016 | Harkness |
| 9,463,741 | B2 | 10/2016 | Fukuda et al. |
| 9,580,017 | B2 | 2/2017 | Foote et al. |
| 9,598,016 | B2 | 3/2017 | Blank et al. |
| 9,604,573 | B2 | 3/2017 | Shimizu et al. |
| 9,654,687 | B2 | 5/2017 | Varonos |
| 9,661,280 | B2 | 5/2017 | Riad et al. |
| 9,674,490 | B2 | 6/2017 | Koravadi |
| 9,959,767 | B1 | 5/2018 | Canella et al. |
| 9,969,330 | B2 | 5/2018 | Brandl et al. |
| 10,007,854 | B2 | 6/2018 | Blayvas et al. |
| 10,109,200 | B1 | 10/2018 | Delorme et al. |
| 10,144,289 | B2 | 12/2018 | Lee et al. |
| 10,183,621 | B2 | 1/2019 | Hara |
| 10,210,761 | B2 | 2/2019 | Rau et al. |
| 10,222,613 | B2 | 3/2019 | Kawamoto et al. |
| 10,232,848 | B2 | 3/2019 | Sherony |
| 10,247,941 | B2 | 4/2019 | Fursich |
| 10,303,181 | B1 | 5/2019 | Wengreen et al. |
| 10,315,573 | B2 | 6/2019 | Bongwald |
| 10,331,963 | B2 | 6/2019 | Nakano et al. |
| 10,343,607 | B2 | 7/2019 | Kumon et al. |
| 10,345,605 | B2 | 7/2019 | Lee et al. |
| 10,744,938 | B1 | 8/2020 | Englander et al. |
| 11,000,752 | B2 | 5/2021 | Giampietro et al. |
| 2008/0309764 | A1 | 12/2008 | Kubota et al. |
| 2009/0299857 | A1 | 12/2009 | Brubaker |
| 2014/0019005 | A1 | 1/2014 | Lee et al. |
| 2014/0285666 | A1 | 9/2014 | O'Connell et al. |
| 2014/0293267 | A1 | 10/2014 | Itao et al. |
| 2014/0336876 | A1 | 11/2014 | Gieseke et al. |
| 2015/0092042 | A1 | 4/2015 | Fursich |
| 2016/0137126 | A1 | 5/2016 | Fursich et al. |
| 2016/0311375 | A1 | 10/2016 | Biemer |
| 2017/0015248 | A1 | 1/2017 | Baur |
| 2017/0336599 | A1 | 2/2017 | Siddiqui et al. |
| 2017/0129405 | A1 | 5/2017 | Oba |
| 2017/0218678 | A1 | 8/2017 | Kothari |
| 2017/0282796 | A1 | 10/2017 | Kosaki |
| 2018/0050636 | A1 | 2/2018 | Espig |
| 2018/0096605 | A1 | 4/2018 | Bai et al. |
| 2018/0134217 | A1 | 5/2018 | Peterson et al. |
| 2018/0136652 | A1 | 5/2018 | Jiang et al. |
| 2018/0154892 | A1* | 6/2018 | Tamura .................. G06V 20/56 |
| 2018/0158255 | A1 | 6/2018 | Garcia et al. |
| 2018/0170261 | A1 | 6/2018 | Kaltenmark et al. |
| 2018/0229649 | A1 | 8/2018 | Salter et al. |
| 2018/0272936 | A1 | 9/2018 | Worthen et al. |
| 2018/0272948 | A1 | 9/2018 | Kumon et al. |
| 2018/0290593 | A1 | 10/2018 | Cho |
| 2018/0334100 | A1 | 11/2018 | Tschirhart |
| 2019/0005337 | A1 | 1/2019 | Boving |
| 2019/0122037 | A1 | 4/2019 | Russell et al. |
| 2019/0161274 | A1 | 5/2019 | Paschall, II et al. |
| 2019/0241126 | A1 | 8/2019 | Murad et al. |
| 2019/0248288 | A1 | 8/2019 | Oba |
| 2019/0287282 | A1 | 9/2019 | Mohan et al. |
| 2019/0367021 | A1 | 12/2019 | Zhao et al. |
| 2020/0160537 | A1 | 5/2020 | Urtasun et al. |
| 2021/0097408 | A1* | 4/2021 | Sicconi .................. G06N 20/00 |

* cited by examiner

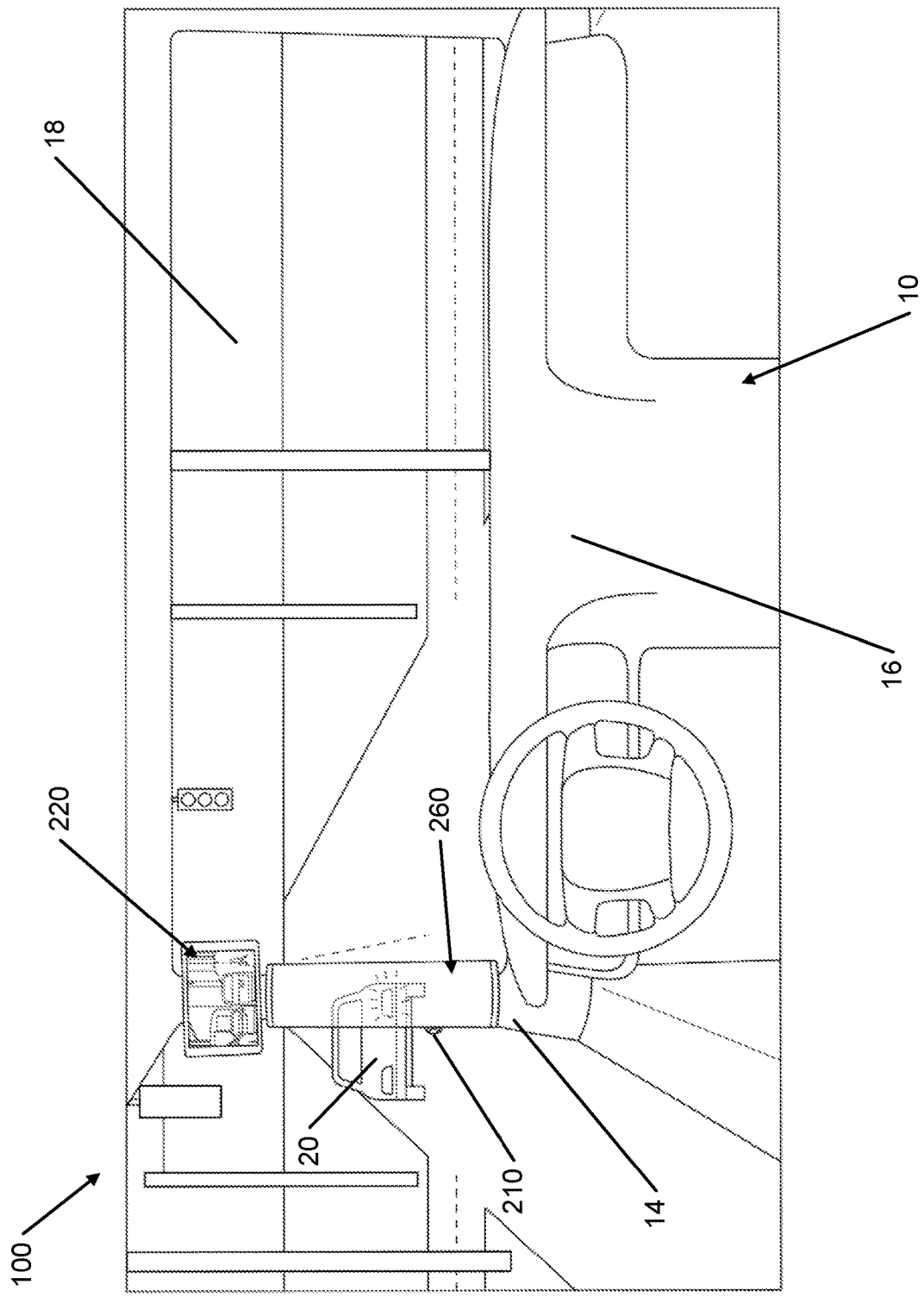
FIG. 7A1

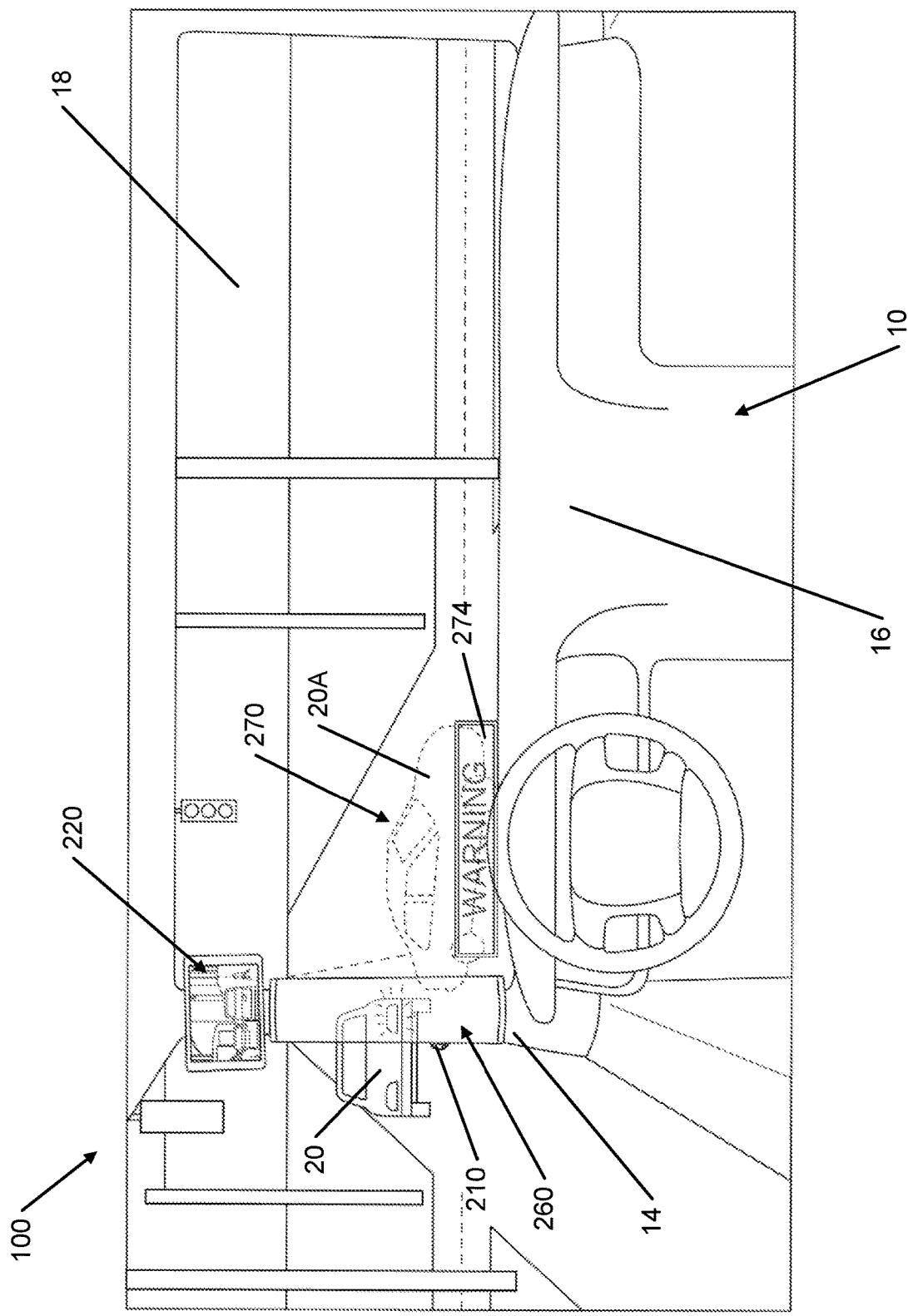
FIG. 7A2

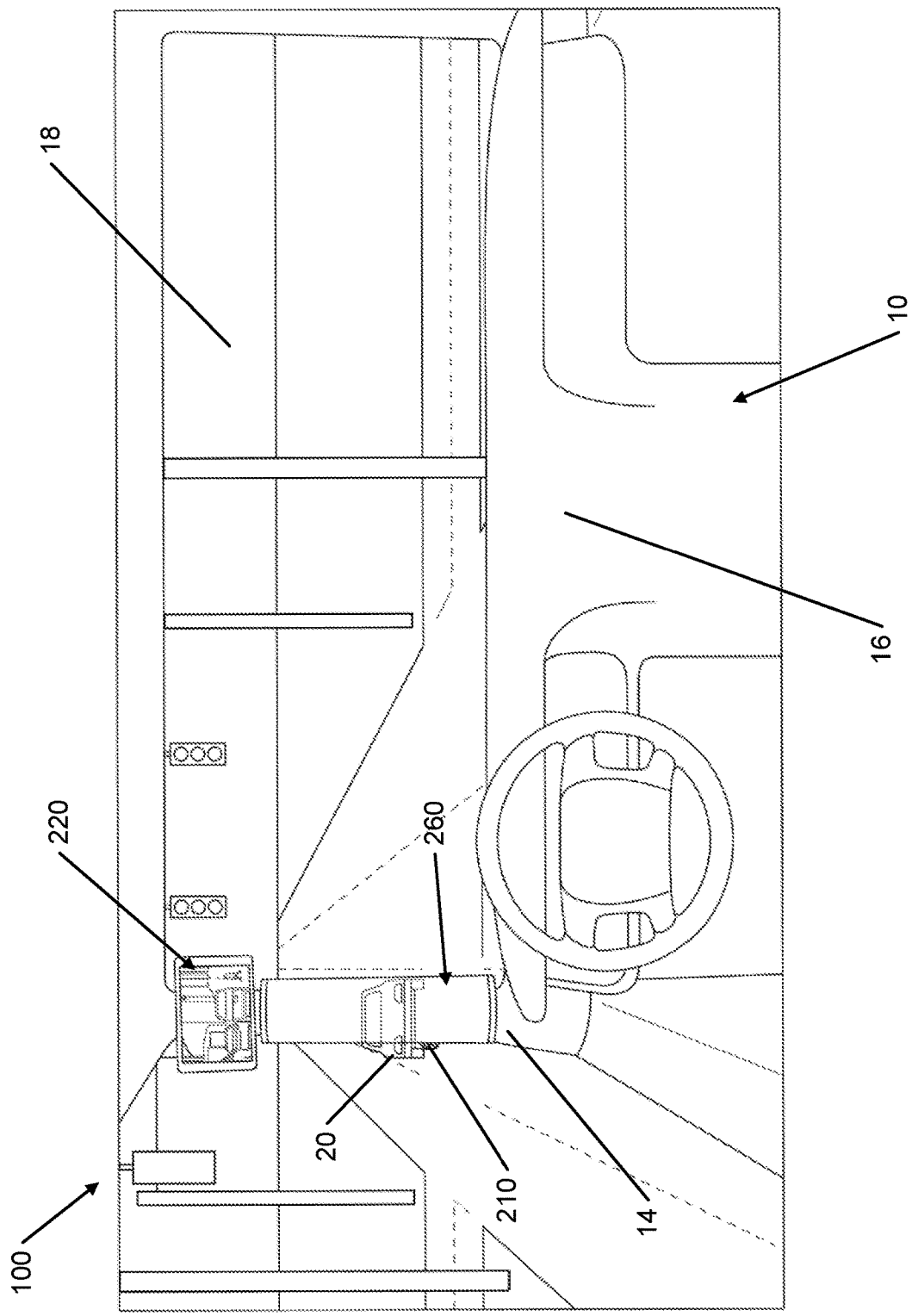
FIG. 7B1

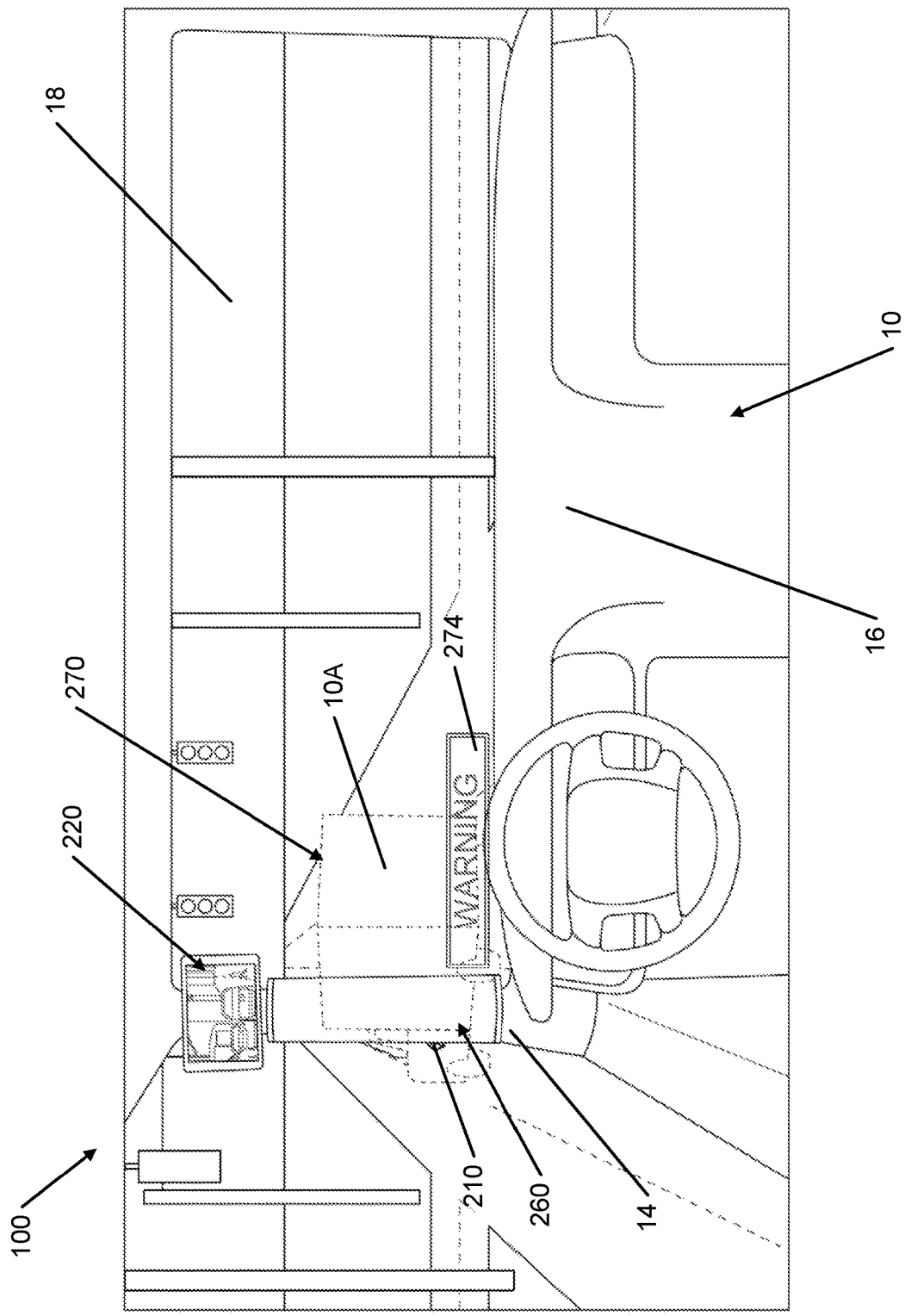
FIG. 7B2

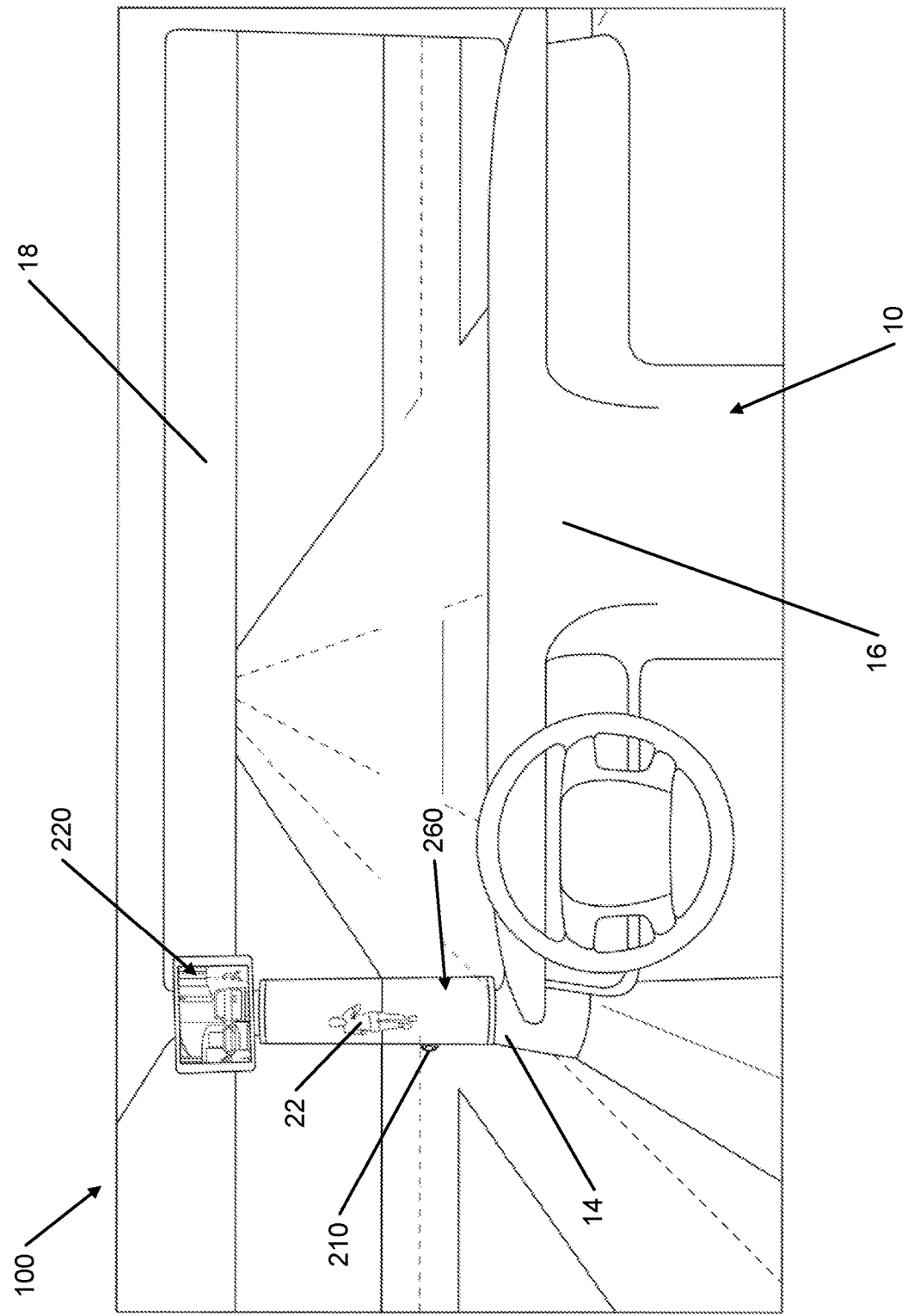
FIG. 7D1

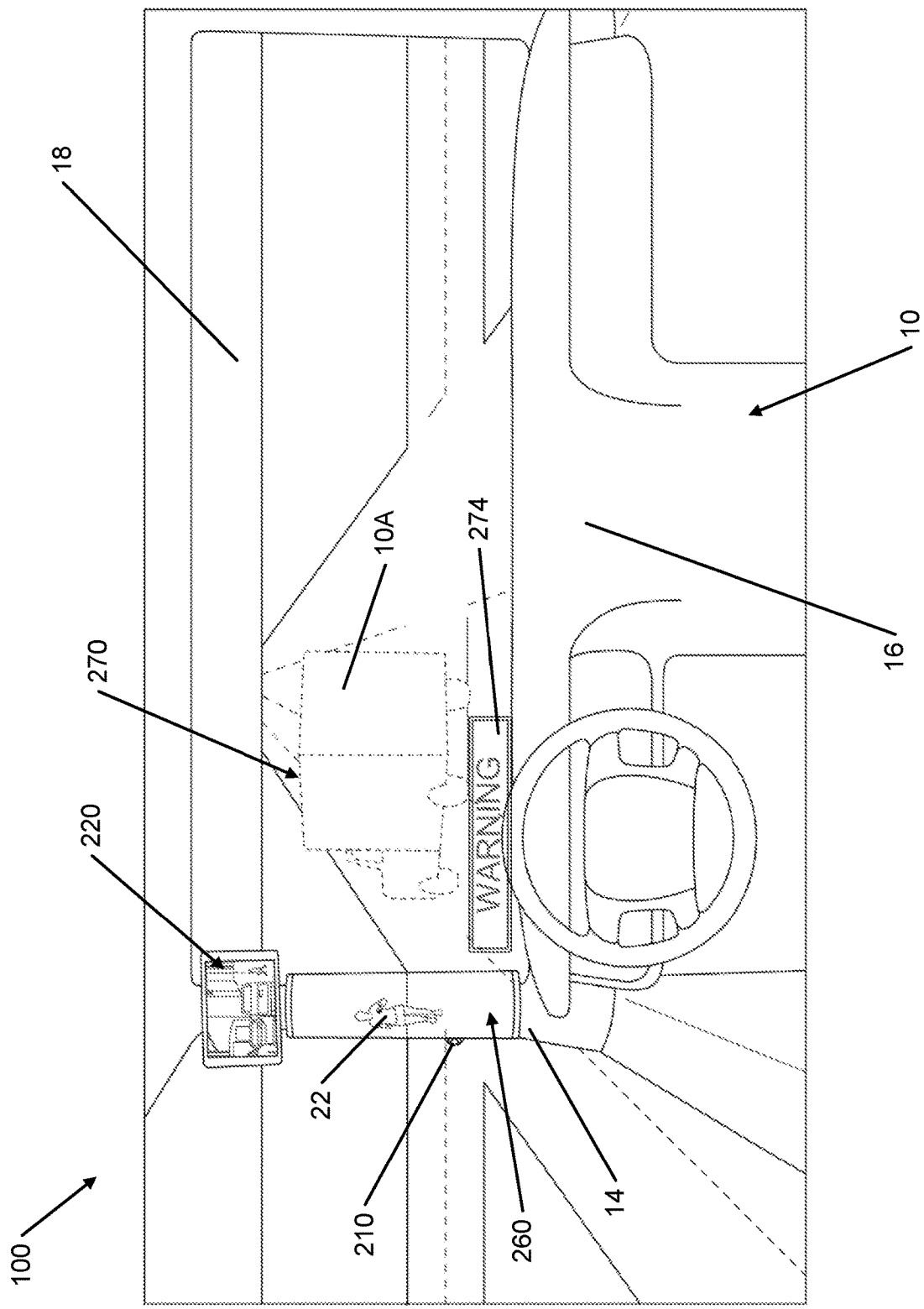
FIG. 7D2

INTERACTIVE SAFETY SYSTEM FOR VEHICLES

CROSS-REFERENCE TO RELATED APPLICATIONS

This application is a continuation of U.S. patent application Ser. No. 17/232,068, filed Apr. 15, 2021 (allowed), which application is a continuation of U.S. patent application Ser. No. 16/930,974, filed Jul. 16, 2020 (now U.S. Pat. No. 10,981,507, issued Apr. 20, 2021), which claims priority to U.S. Provisional Patent No. 62/932,188, filed Nov. 7, 2019, entitled Interactive Safety System for Vehicles, each of which are incorporated herein by reference in their entireties and made a part hereof.

FIELD OF THE INVENTION

The present invention relates vehicles, and more particularly, an interactive vehicle safety system having capabilities to improve peripheral vision, provide warning, and improve reaction time for operators of vehicles.

BACKGROUND

Currently, there are a number of vehicle collisions and accidents related to reduced peripheral vision. A system is needed to improve safety for vehicles by improving peripheral vision and situational awareness to reduce vehicle collisions and accidents. A system is also needed with predictive capabilities for vehicles, people, and other objects that will help the driver to make initial decisions and have the machine or system take over the decision-making and actions when the driver is making a mistake (i.e. an imminent accident or collision). This is especially needed with bigger vehicles, for example trucks, trains, etc.

SUMMARY

The present invention generally provides an interactive vehicle safety system having capabilities to improve peripheral vision, provide warning, and improve reaction time for operators of vehicles, there are a number of vehicle collisions and accidents related to reduced peripheral vision.

According to one embodiment, an interactive safety system for vehicles may comprise: one or more image capturing devices located on the vehicle configured to transmit one or more images from the vehicle to a processor; one or more object detecting sensors located on the vehicle that detect location, speed, and direction data of one or more objects external to the vehicle; and a display system connected to the processor. The one or more object detecting sensors may be configured to transmit the location, speed, and direction data from the one or more objects to the processor. The display system may comprise a pillar display located on an A-pillar of the vehicle configured to portray an image blocked by an obstruction of the A-pillar from the one or more image capturing devices. The processor and a memory unit storing computer-executable instructions, which when executed by the processor, may cause the processor to: receive images from the one or more image capturing devices; receive the location, speed, and direction data from the one or more object detecting sensors; process in real-time the images and the location, speed, and direction data from the one or more objects external to the vehicle; track in real-time the one or more objects external to the vehicle using the images and the location, speed, and direction data; predict a future location and a route of the one or more objects external to the vehicle using a predictive algorithm and a trajectory analysis of the one or more objects external to the vehicle; determine in real-time a danger object from the one or more objects external to the vehicle, wherein the danger object is a potential collision based on the predictive algorithm and trajectory analysis; and display the image blocked by the obstruction of the A-pillar on the pillar display.

Additionally, the processor and the memory unit storing computer-executable instructions may cause the processor to further provide a visual warning to the danger object, wherein the visual warning is provided external to the vehicle. The processor and the memory unit storing computer-executable instructions may cause the processor to further provide an audible warning to the danger object, wherein the audible warning is provided external to the vehicle, wherein the audible warning is a 3D sound directed to the danger object. Additionally, the one or more object detecting sensors may be ultrasonic sensors, LIDAR radar sensors, or photoelectric sensors. The processor and the memory unit storing computer-executable instructions may cause the processor to further light a path of the vehicle with high-intensity lights based on the predictive algorithm and trajectory analysis, wherein the path is externally outside the vehicle on a pavement of a street. Additionally, the display system may further include a heads-up display on a windshield of the vehicle to display the one or more objects with the location, speed, and direction data and the danger object with the future location and the route on a heads-up display. The display system may further include a dashboard display on a dashboard of the vehicle to display the one or more objects with the location, speed, and direction data and the danger object with the future location and the route on a heads-up display.

According to another embodiment, an interactive safety system for vehicles may comprise: one or more image capturing devices located on the vehicle configured to transmit one or more images from the vehicle to a processor; one or more object detecting sensors located on the vehicle that detect location, speed, and direction data of one or more objects external to the vehicle; and a display system connected to the processor. The display system may include a pillar display located on an A-pillar of the vehicle configured to portray an image blocked by an obstruction of the A-pillar from the one or more image capturing devices; and a rear-view display located in the vehicle configured to portray an image that would be seen in a rear-view mirror from the one or more image capturing devices. Further, the one or more object detecting sensors may be configured to transmit the location, speed, and direction data from the one or more objects to the processor. The processor and a memory unit storing computer-executable instructions, which when executed by the processor, may cause the processor to: receive images from the one or more image capturing devices; receive the location, speed, and direction data from the one or more object detecting sensors; process in real-time the images and the location, speed, and direction data from the one or more objects external to the vehicle; track in real-time the one or more objects external to the vehicle using the images and the location, speed, and direction data; predict a future location and a route of the one or more objects external to the vehicle using a predictive algorithm and a trajectory analysis of the one or more objects external to the vehicle; determine in real-time a danger object from the one or more objects external to the vehicle, wherein the danger object is a potential collision based on the predictive algorithm and trajectory analysis; display the image blocked by the obstruction of the A-pillar on the pillar display; and display the image that would be seen in the rear-view mirror on the rear-view display.

In yet a further embodiment, an interactive safety system for vehicles may comprise: one or more image capturing devices located on the vehicle configured to transmit one or more images from the vehicle to a processor; one or more object detecting sensors located on the vehicle that detect location, speed, and direction data of one or more objects external to the vehicle; one or more telematics devices configured to transmit vehicle telematics data from the vehicle to the processor; and a display system connected to the processor. The display system may include: a pillar display located on an A-pillar of the vehicle configured to portray an image blocked by an obstruction of the A-pillar from the one or more image capturing devices; a rear-view display located in the vehicle configured to portray an image that would be seen in a rear-view mirror from the one or more image capturing devices; and heads-up display on a windshield of the vehicle to display the one or more objects with the location, speed, and direction data. Additionally, the one or more object detecting sensors configured to transmit the location, speed, and direction data from the one or more objects to the processor. The processor and a memory unit storing computer-executable instructions, which when executed by the processor, may cause the processor to: receive images from the one or more image capturing devices; receive the location, speed, and direction data from the one or more object detecting sensors; receive the telematics data from the telematics device; process in real-time the images, the telematics data, and the location, speed, and direction data from the one or more objects external to the vehicle; track in real-time the one or more objects external to the vehicle using the images and the location, speed, and direction data; predict a future location and a route of the one or more objects external to the vehicle using a predictive algorithm and a trajectory analysis of the one or more objects external to the vehicle; determine in real-time a danger object from the one or more objects external to the vehicle, wherein the danger object is a potential collision based on the predictive algorithm and trajectory analysis; highlight the danger object on the display system; display the image blocked by the obstruction of the A-pillar on the pillar display; display the image that would be seen in the rear-view mirror on the rear-view display; and display the one or more objects with the location, speed, and direction data and the danger object with the future location and the route on the heads-up display. Further, the danger object may be highlighted yellow if the danger object is potentially in a path of an accident or a collision and the danger object may be highlighted red if the danger object is imminently in a path of an accident or a collision with the vehicle. The highlighting of the danger object may include one or more of the following: blinking colors on the danger object, circles around the danger object, or blinking circles around the danger object.

In an additional embodiment, an interactive safety system for vehicles may comprise: one or more image capturing devices located on the vehicle configured to transmit one or more images from the vehicle to a processor; one or more object detecting sensors located on the vehicle that detect location, speed, and direction data of one or more objects external to the vehicle; and a display system connected to the processor. The display system may include a pillar display located on an A-pillar of the vehicle configured to portray an image blocked by an obstruction of the A-pillar from the one or more image capturing devices. The one or more object detecting sensors may be configured to transmit the location, speed, and direction data from the one or more objects to the processor. The processor and a memory unit storing computer-executable instructions, which when executed by the processor, may cause the processor to: receive images from the one or more image capturing devices; receive the location, speed, and direction data from the one or more object detecting sensors; process in real-time the images and the location, speed, and direction data from the one or more objects external to the vehicle; track in real-time the one or more objects external to the vehicle using the images and the location, speed, and direction data; predict a future location and a route of the one or more objects external to the vehicle using a predictive algorithm and a trajectory analysis of the one or more objects external to the vehicle; determine in real-time a danger object from the one or more objects external to the vehicle, wherein the danger object is a potential collision based on the predictive algorithm and trajectory analysis; display the image blocked by the obstruction of the A-pillar on the pillar display; and provide an audible warning to an operator coming from a location of the danger object, wherein the audible warning is an audio spotlight from an aimed audio device connected to the processor that casts a sound to a surface redirecting the sound to come from the location of the danger object to the vehicle.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIGS. 7A1 and 7A2 illustrate an interactive vehicle safety system with trajectory and dead-reckoning analysis showing a second vehicle turning left in front of a main vehicle in accordance with an embodiment of the present invention;

FIGS. 7B1 and 7B2 illustrate an interactive vehicle safety system with trajectory and dead-reckoning analysis showing a main vehicle turning left in front of a second vehicle in accordance with an embodiment of the present invention;

FIGS. 7D1 and 7D2 illustrate an interactive vehicle safety system with trajectory and dead-reckoning analysis showing a main vehicle turning left in front of a pedestrian in a crosswalk in accordance with an embodiment of the present invention;

Figure 1:
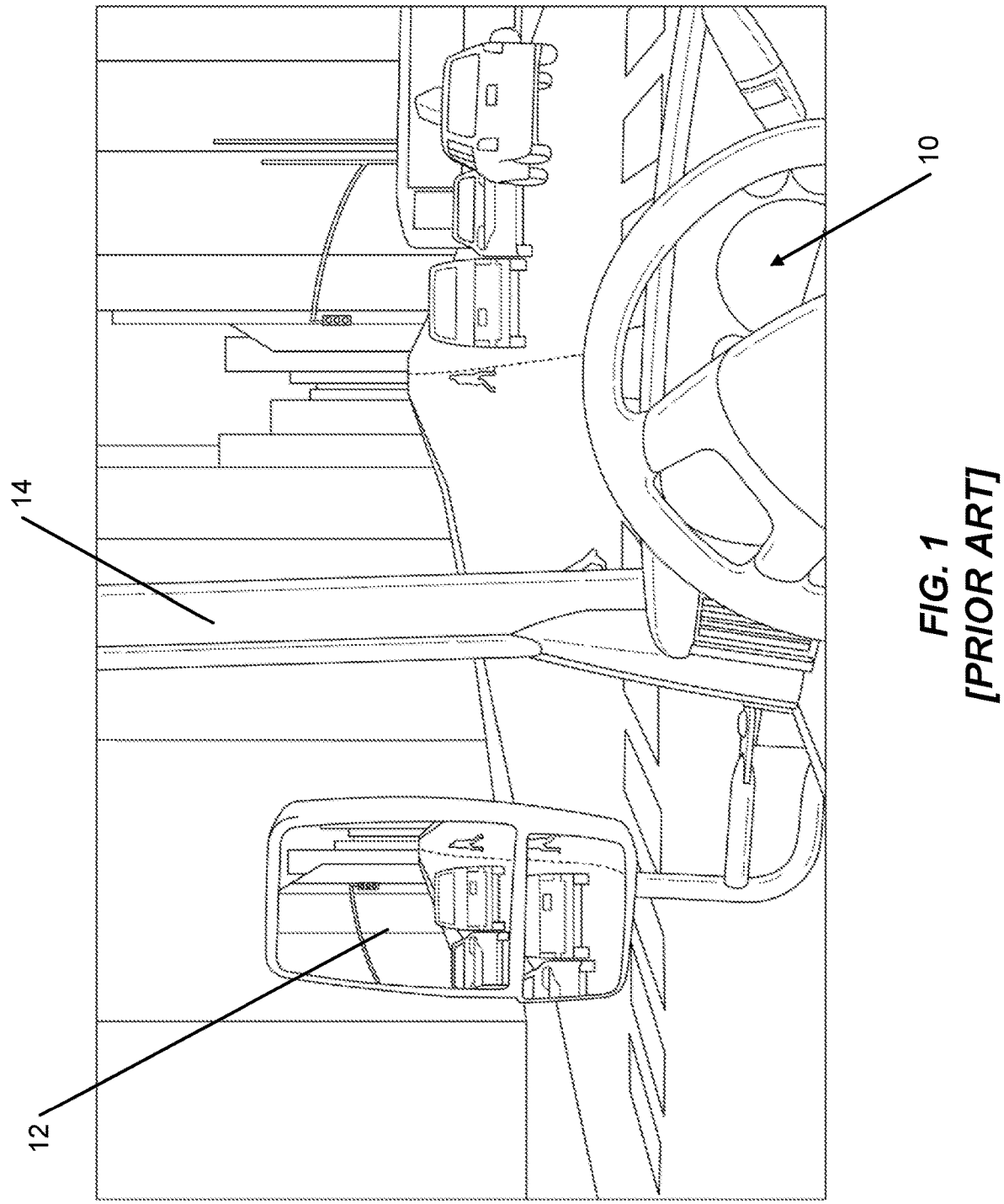
FIG. 1 illustrates a prior art version of a vehicle with a side rearview mirror and an A-pillar.

The reader is advised that the attached drawings are not necessarily drawn to scale.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

The present invention relates to vehicles, and more particularly, an interactive vehicle safety system having capabilities to improve peripheral vision, provide warning, and improve reaction time for operators of vehicles. For example, the interactive vehicle safety system may have capabilities for portraying objects, which are being blocked by any of the structural pillars and/or mirrors of a vehicle (such as a truck, van, train, etc.). The interactive vehicle safety system disclosed may comprise one or more image capturing devices (such as camera, sensor, laser), distance and object sensors (such as ultrasonic sensor, LIDAR radar sensor, photoelectric sensor, and infrared sensor), a real-time image processing of an object, and one or more display systems (such as LCD or LED displays). The interactive vehicle safety system may give a seamless 360-degree front panoramic view to a driver.

The invention relates to an interactive vehicle safety system that includes real-time image processing for a vehicle with clear metal technology. Clear metal technology refers to the capability for portraying objects, which are being blocked by any of the structural pillars and/or mirrors of a vehicle. The clear metal technology may use one or multiple cameras located on the other side of a structural pillar or obstruction blocking the vision of the operator to portray an image blocked by the structural pillar/obstruction on the structural pillar/obstruction of the vehicle to make the structural pillar/obstruction functionally disappear. The interactive vehicle safety system and clear metal technology may be used with vehicles such as automobiles, trucks, trains, bicycles, motorcycles, trains, forklifts, etc.

The interactive vehicle safety system may include one or more features such as: changing the image on the screen as the vehicle driver's head moves (using one camera or multiple cameras in "stereo" tracking the driver's head position); detect and track in real-time object movement outside the vehicle and highlight stationary or moving objects around the vehicle that may be "danger" by using trajectory analysis and dead reckoning of the vehicle (speed, direction, turn radius, etc.) and/or using trajectory analysis and dead reckoning of the moving objects (speed, direction, etc.); and a dead reckoning heads-up display to include object detecting sensors (for example, ultrasonic sensor, LIDAR radar sensor, photoelectric sensor, and infrared sensor) to the front bumper, rear bumper, or other locations around the vehicle that provides a dead reckoning time fully across the windshield. The interactive vehicle safety system may utilize sensors on the vehicle to sense objects approaching to turn-on the clear metal technology and turn off the clear metal technology if nothing is sensed by the sensors.

FIG. 1 illustrates a prior art version of the inside of a vehicle 10. As illustrated in the prior art, the vehicle 10 includes a large rear-view mirror 12 and a structural A-pillar 14 on the vehicle 10. FIG. 1 demonstrates the need for a system to improve the peripheral vision of the driver from the blocked view of the rear-view mirror 12 and/or one or more of the structural pillars 14 of the vehicle 10.

Figure 2:
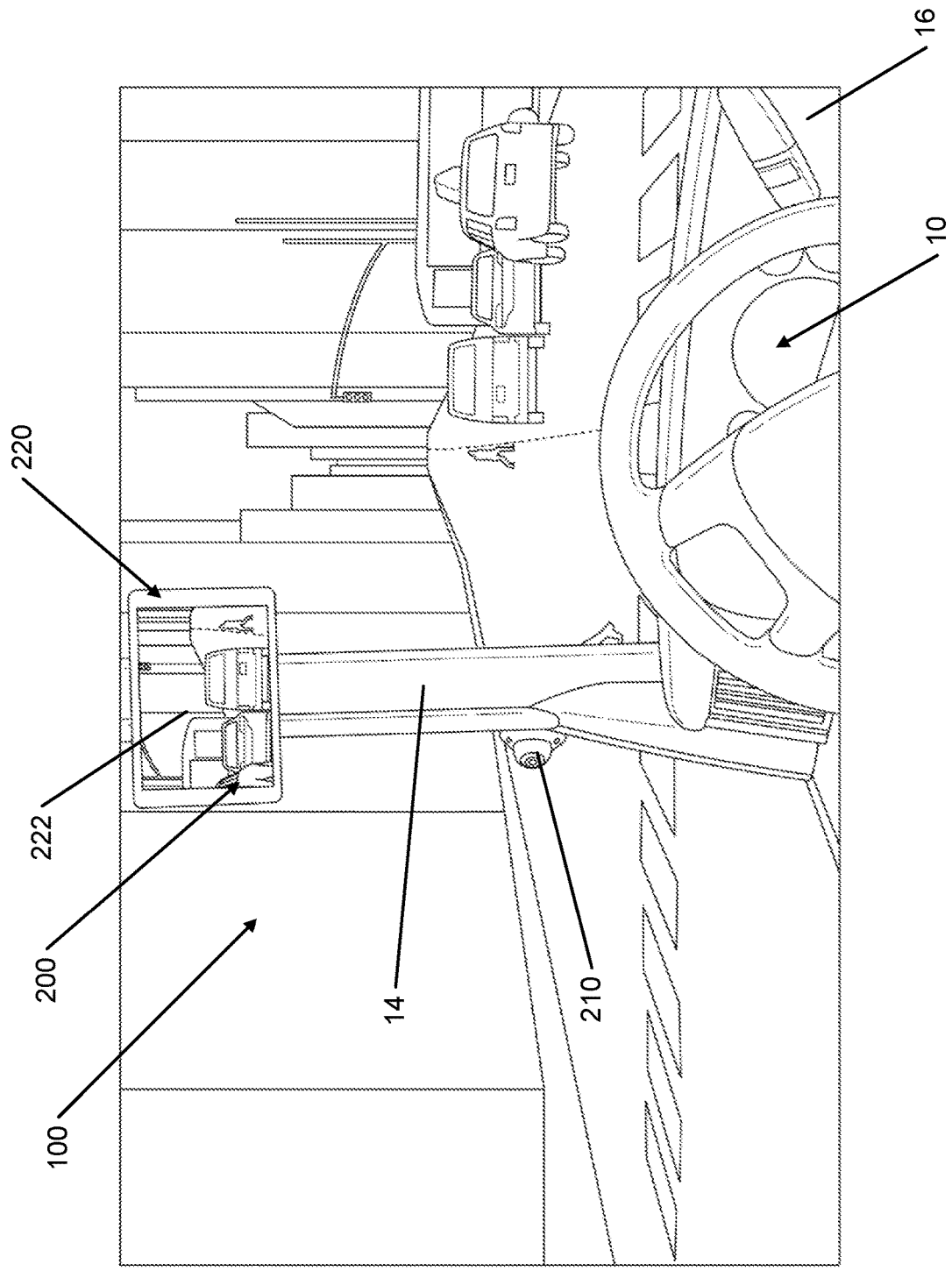
FIG. 2 illustrates a vehicle with an interactive vehicle safety system with side rearview mirror elimination in accordance with an embodiment of the present invention.

FIG. 2 illustrates a vehicle 10 with an interactive vehicle safety system 100 with a side rearview mirror elimination system 200. The side mirror elimination system 200 of the interactive vehicle safety system 100 of FIG. 2 may include one or more image capturing devices 210 (such as a camera, sensor, or laser) to take the place of the rearview mirror 12, real-time image processing, and one or more display systems 220 (such as an LCD or LED display) to portray an image 222 that would be seen on the rear-view mirror 12. In one embodiment the display system 220 may be a retina scanner display. In another example, the display 220 may be flat, flexible, bendable, or curved without departing from this invention. As illustrated in FIG. 2, the display system 220 may be located on the A-pillar 14. The one or more displays 220 may be located in other locations without departing from this invention, such as located on another structural pillar, the dashboard 16, or as part of a heads-up-display or other locations.

Figure 3:
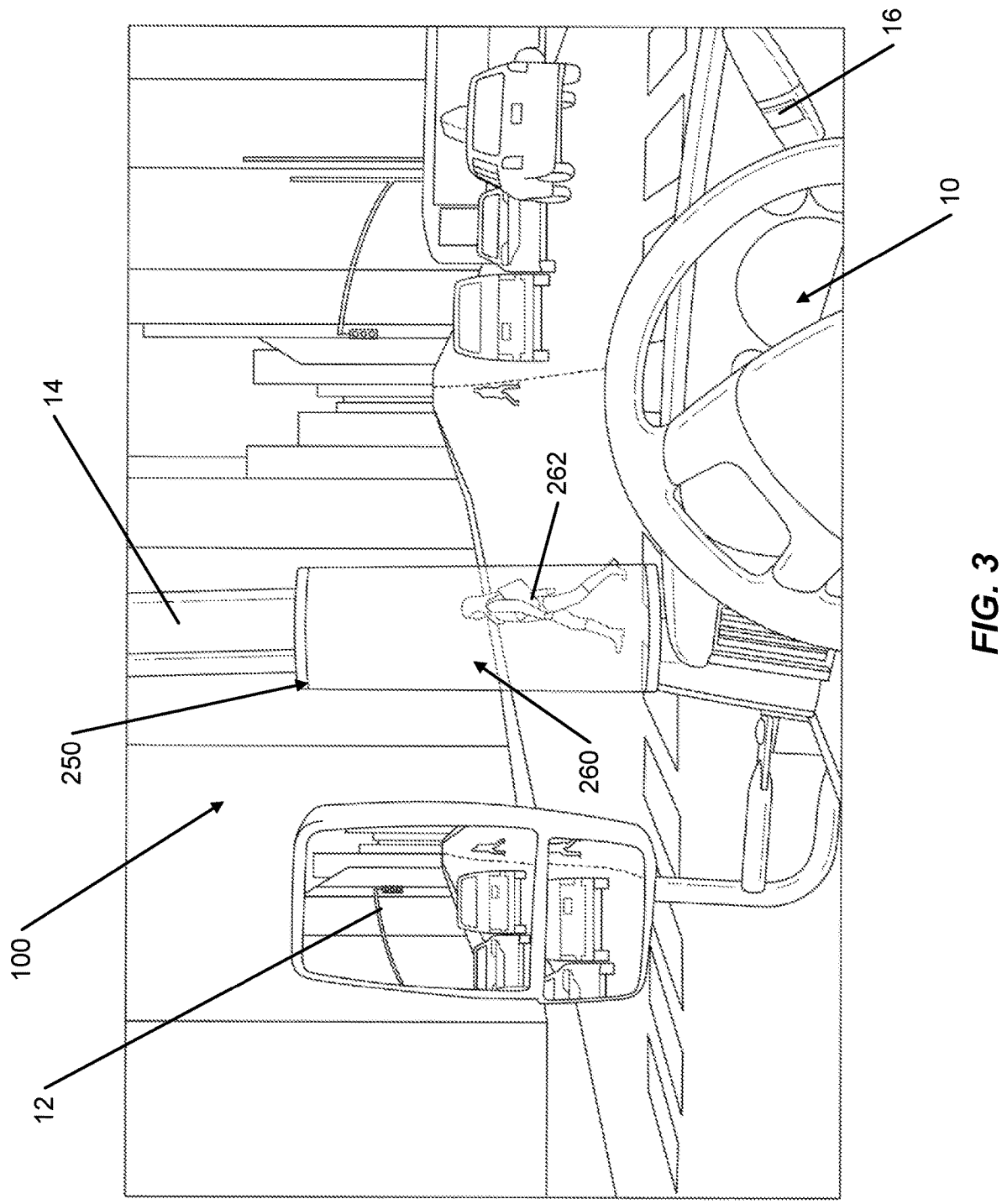
FIG. 3 illustrates a vehicle with an interactive vehicle safety system having pillar obstruction elimination in accordance with an embodiment of the present invention.

FIG. 3 illustrates a vehicle 10 with an interactive vehicle safety system 100 having a pillar obstruction elimination system 250 and capabilities for portraying objects that are being blocked by an A-pillar 14 (or other structural pillars) of the vehicle 10. The pillar obstruction elimination system 250 of the interactive vehicle safety system 100 of FIG. 3 may include one or more image capturing devices (such as a camera, sensor, or laser) to portray an image 262 blocked by the obstruction of the A-pillar 14 on the vehicle 10 to make the structural pillar/obstruction 14 functionally disappear. The interactive vehicle safety system 100 may include real-time image processing and one or more display systems 260 (such as an LCD or LED display) to portray the image 262 that blocked by the A-pillar 14. In one embodiment, the display system 260 may be a retina scanner display. In another example, the display 260 may be flat, flexible, bendable, or curved without departing from this invention. As illustrated in FIG. 3, the display system 260 may be located on the A-pillar 14. The display 260 may be located in other locations without departing from this invention, such as located on another structural pillar, the dashboard 16, or as part of a heads-up-display or other locations.

Figure 4:
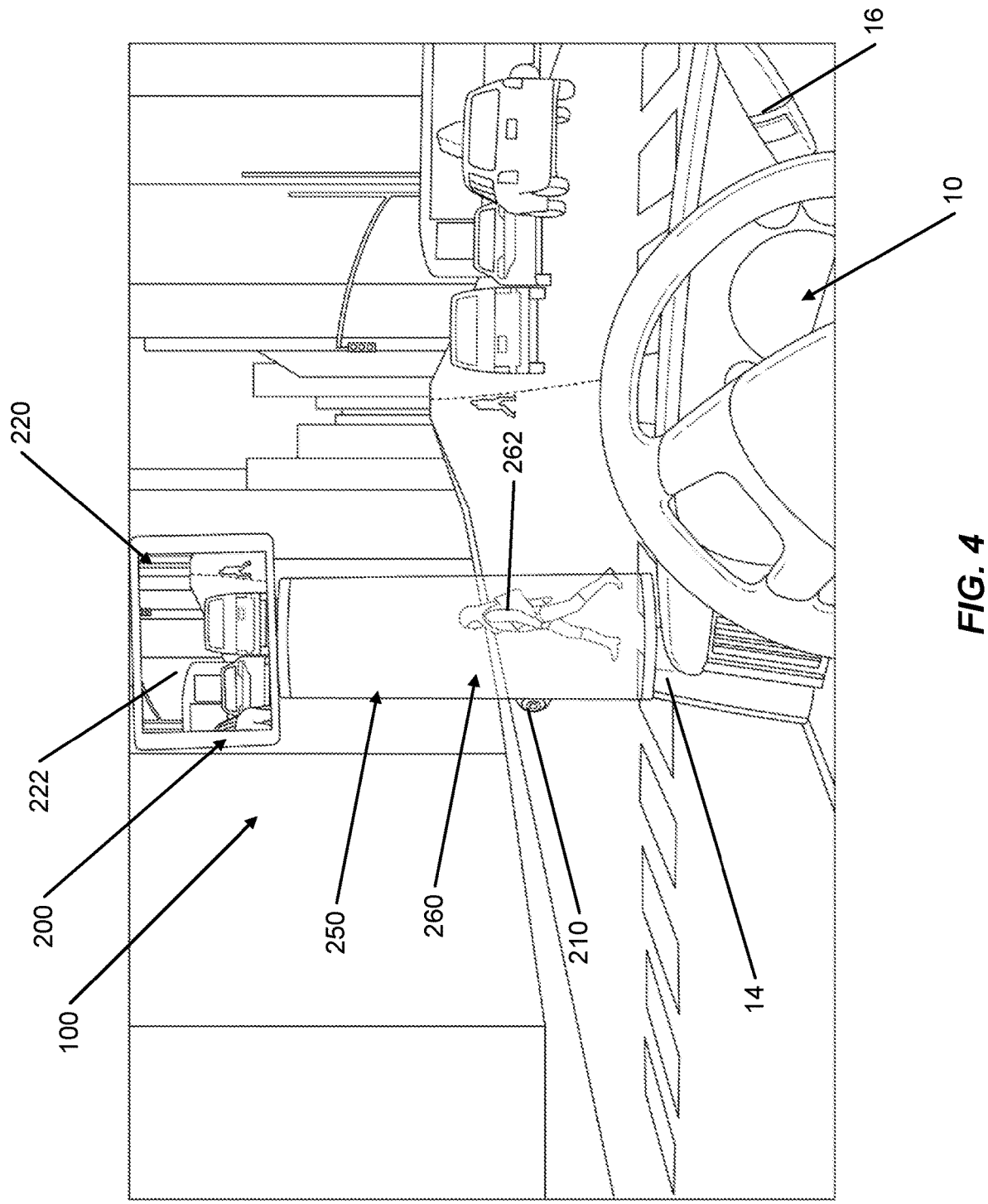
FIG. 4 illustrates a vehicle with an interactive vehicle safety system having both the side rearview mirror elimination and pillar obstruction elimination in accordance with an embodiment of the present invention.

FIG. 4 illustrates a vehicle 10 with an interactive vehicle safety system 100 having both a side rearview mirror elimination system 200 and a pillar obstruction elimination system 260 for portraying objects that are being blocked by an A-pillar 14 or other structural pillar of the vehicle 10. The interactive vehicle safety system 100 of FIG. 4 may include one or more image capturing devices 210 (such as a camera, sensor, or laser) to take the place of the rearview mirror. Additionally, the interactive vehicle safety system 100 of FIG. 4 may include one or more image capturing devices (such as a camera, sensor, or laser) to portray an image 262 blocked by the obstruction of the A-pillar 14 on the vehicle 10 to make the structural pillar/obstruction 14 functionally disappear. The interactive vehicle safety system 100 may include real-time image processing and a display system with one or more displays 220, 260 (such as an LCD or LED display) to portray the image 222 that would be seen on the rear-view mirror 12 and to portray the image 262 that blocked by the A-pillar 14 or other structural pillar. In one embodiment the displays 220, 260 may be a retina scanner display. In another example, the displays 220, 260 may be flat, flexible, bendable, or curved without departing from this invention. As illustrated in FIG. 4, the display system 220, 260 may be located on the A-pillar 14. The display 220, 260 may be located in other locations without departing from this invention, such as located on another structural pillar, the dashboard 16, or as part of a heads-up-display or other locations.

In general, the interactive vehicle safety system 100 may help an operator detect a collision and provide further information to eliminate or reduce the risks in many different areas, such as: providing vision to the operator, predicting when or how long of a reaction time before an accident occurs, providing audible warnings to the public and operator, providing visual warnings to the public and operator, determining and providing a suggested escape route or action, and determining and providing any automatic vehicle operations in response to the imminent collision (i.e. automatic braking and/or steering).

Figure 5A:
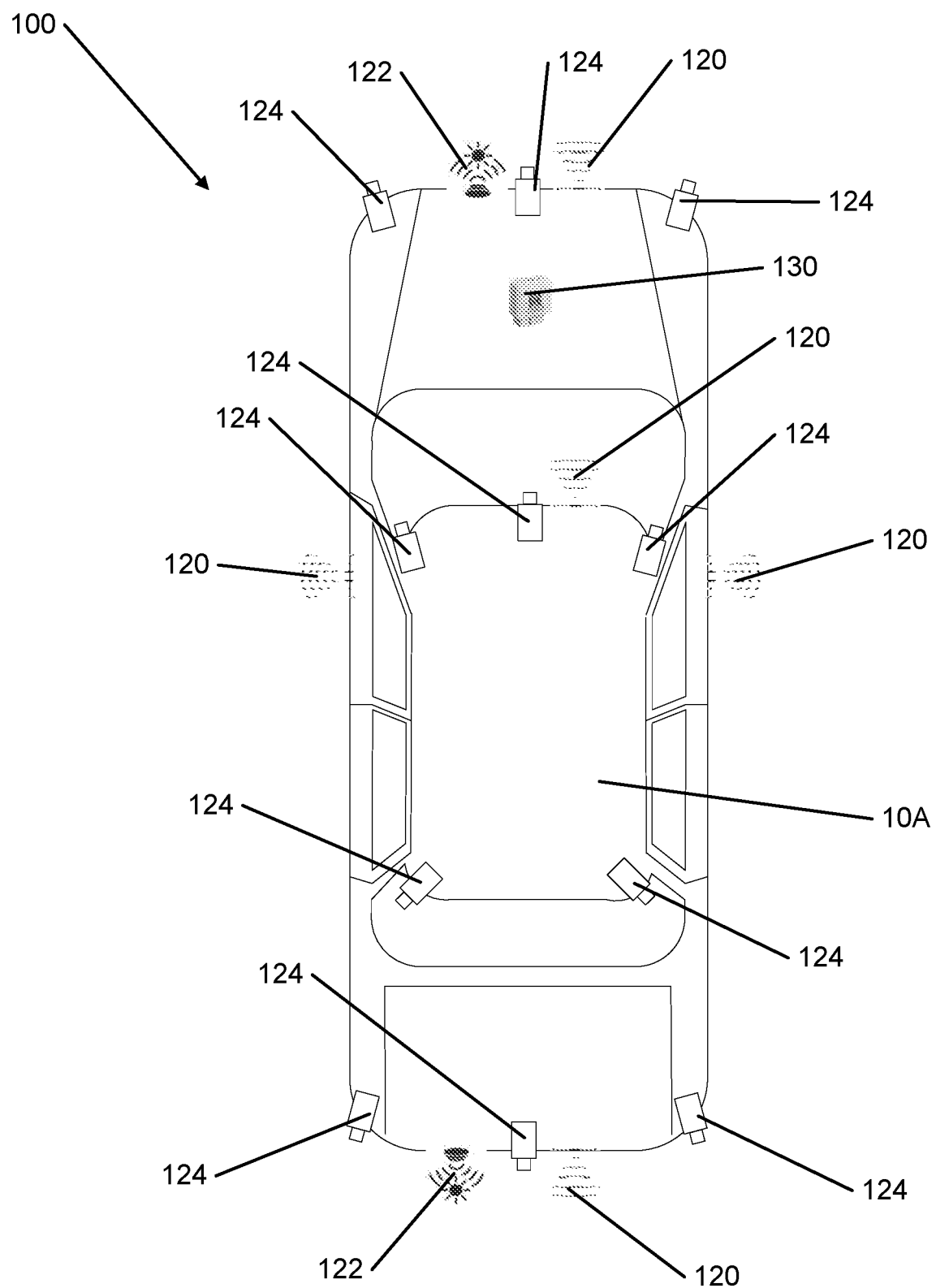
FIGS. 5A-5D illustrate top views of various vehicles with an interactive vehicle safety system in accordance with an embodiment of the present invention.
Figure 5B:
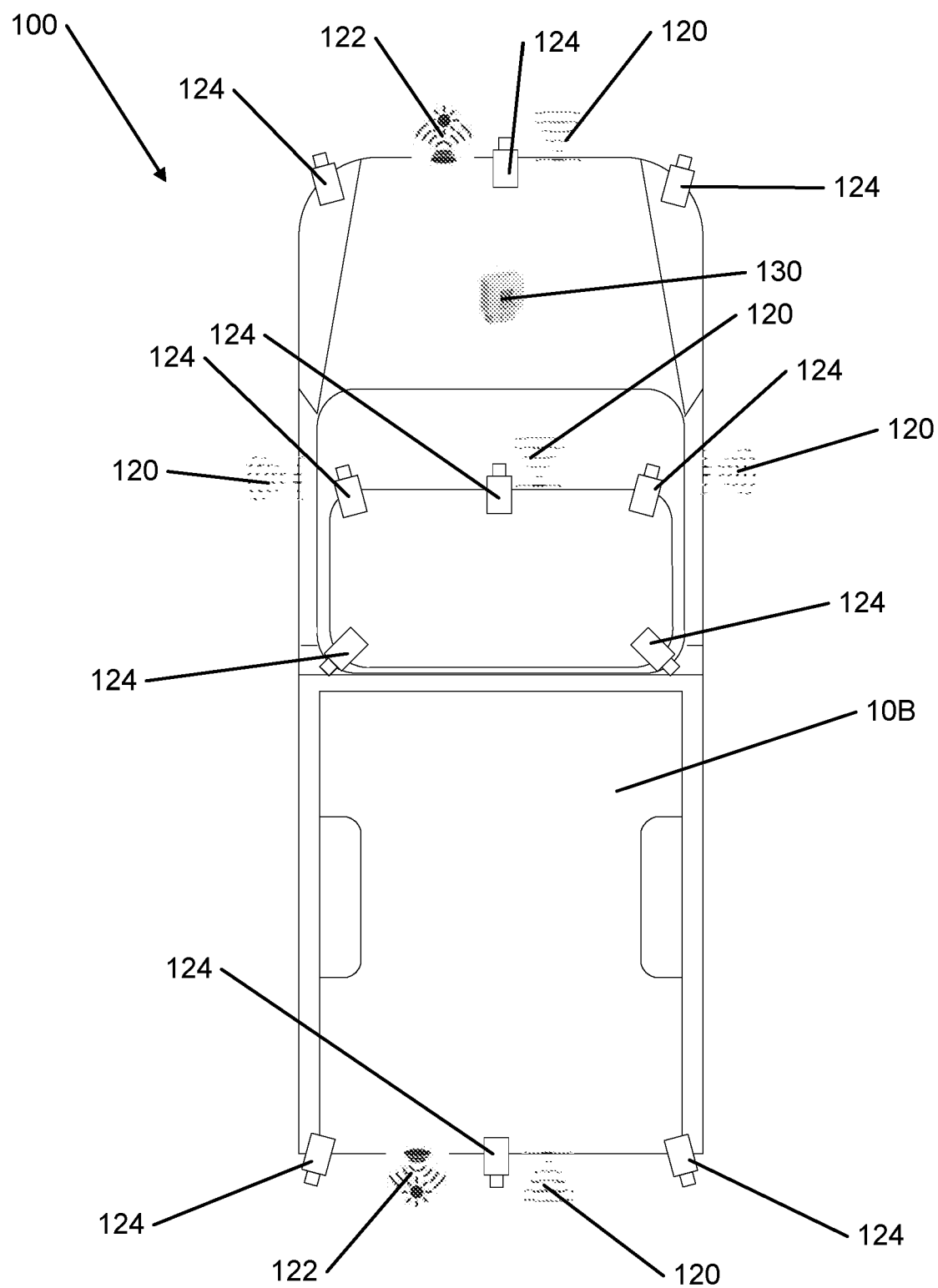
Figure 5C:
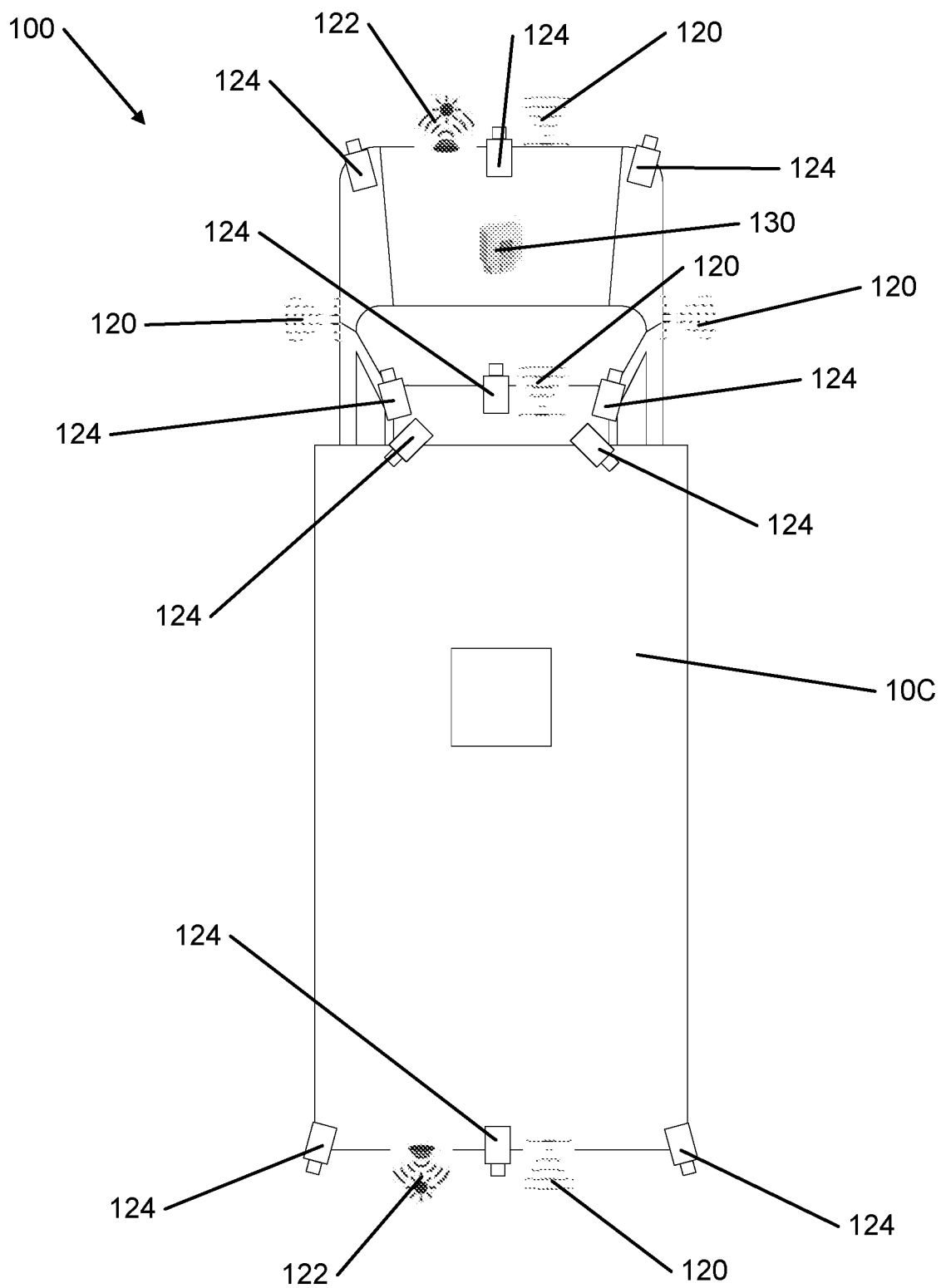
Figure 5D:
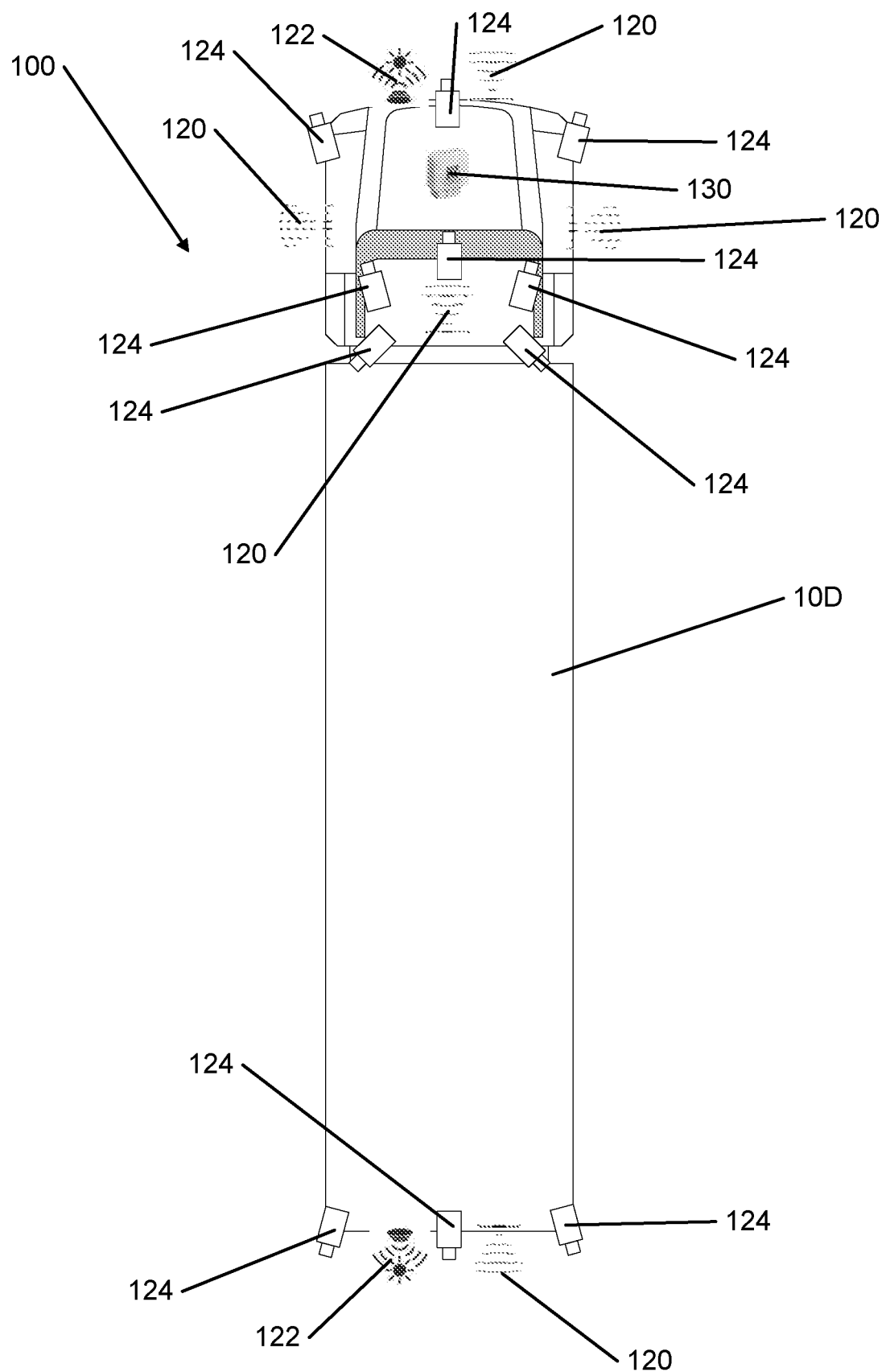

FIGS. 5A-5D illustrate top views of various vehicles with an interactive vehicle safety system 100 and various input systems. FIG. 5A illustrates a top view of an automobile 10A with the interactive vehicle safety system 100. FIG. 5B illustrates a top view of a pick-up truck 10B with the interactive vehicle safety system 100. FIG. 5C illustrates a top view of a delivery truck 10C with the interactive vehicle safety system 100. FIG. 5D illustrates a top view of a semi-truck 10D with the interactive vehicle safety system 100. The interactive vehicle safety system 100 may be utilized with any vehicle without departing from this invention. The interactive vehicle safety system 100 may provide an operator with vision and situational awareness to what is happening external to the vehicle 10 by providing peripheral visual awareness. As illustrated in FIGS. 5A-5D, the interactive vehicle safety system 100 and vehicles 10A, 10B, 10C, 10D may include one or more of the following: cameras 124, object detecting sensors 120, ultrasonic sensors 122, and vehicle telematic sensors 130, etc. Other inputs may be included with the interactive vehicle safety system 100 and vehicles 10A, 10B, 10C, 10D as described and illustrated in FIG. 6. The one or more cameras 124, object detecting sensors 120, etc. and other input data devices as listed and described with FIG. 6 may be located at various locations throughout the vehicle 10, such as on the front bumper, rear bumper or rear area, side of the vehicle 10, on top of the vehicle 10, under the vehicle, within the inside of the vehicle 10, or any other locations that can provide meaningful inputs to the interactive vehicle safety system 100.

Figure 6:
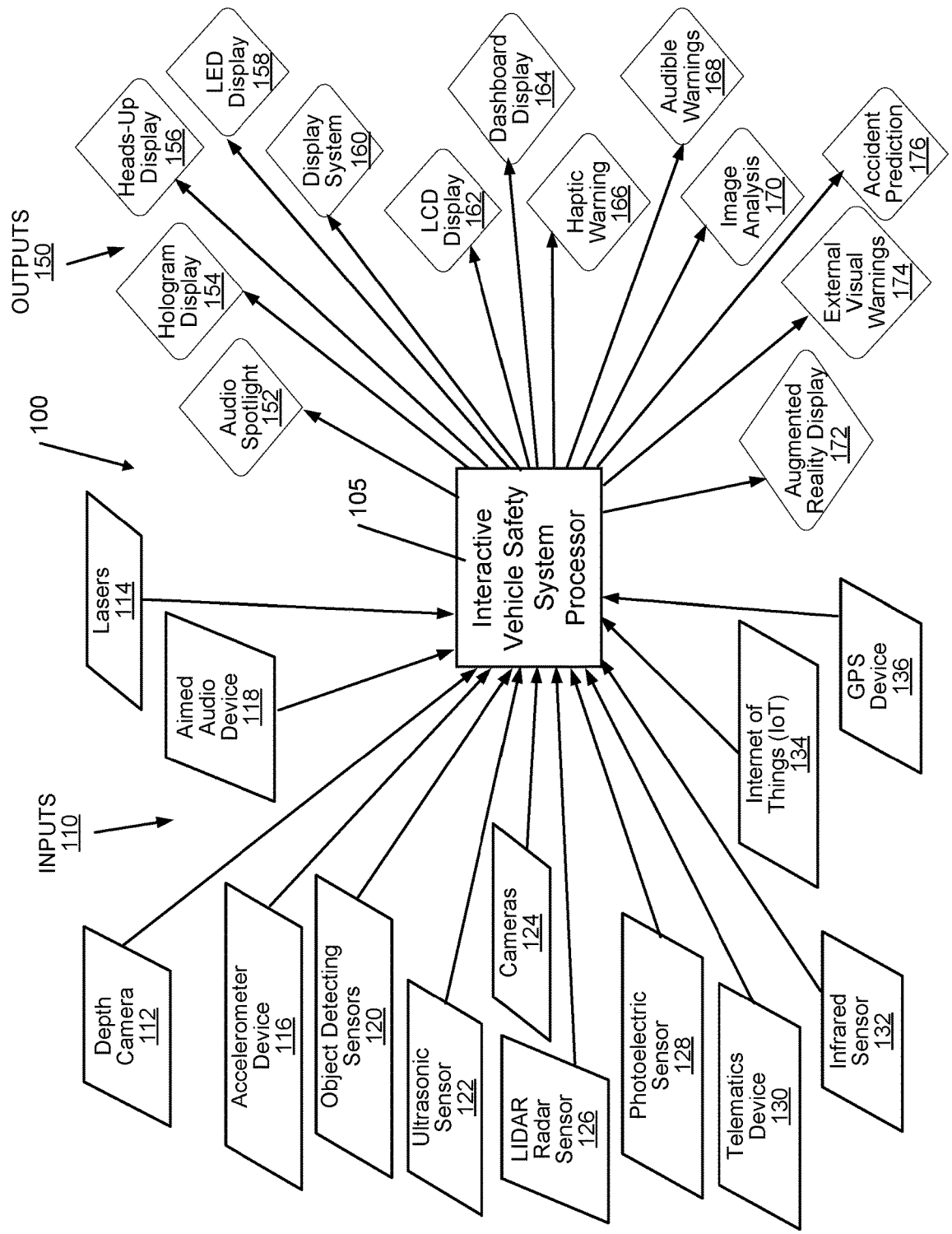
FIG. 6 illustrates an illustrative system depiction of an interactive vehicle safety system in accordance with an embodiment of the present invention.

FIG. 6 illustrates an illustrative system depiction of the interactive vehicle safety system 100. The interactive vehicle safety system 100 may include a processor 105 that includes a processing unit and a system memory to store and execute software instructions. The interactive vehicle safety system 100 may provide various data inputs 110 and provide various outputs 120 to predict a potential incident, determine danger, and inform the vehicle 10 and operator to slow down, turn, or stop. As illustrated in FIG. 6, the various inputs 110 to the processor 105 and the interactive vehicle safety system 100 may include one or more of the following: depth camera 112, lasers 114, accelerometer device 116, aimed audio device 118, object detecting sensors 120, ultrasonic sensor 122, cameras 124, LIDAR radar sensor 126, photoelectric sensor 128, telematics device 130, infrared sensor 132, internet of things (IOT) 132, or GPS device 134. The interactive vehicle safety system 100 may include various image capturing devices, such as cameras 124 to capture what is happening in the real world external to the vehicle 10 and bringing in and highlighting what may happen in the near future. Additionally, the interactive vehicle safety system 100 may include LIDAR radar 126 and other object detecting sensors 120 (such as ultrasonic sensor 122, photoelectric sensor 128, and infrared sensor 132). Other sensors and inputs 110 may be utilized for the interactive vehicle safety system 100, such as GPS 136, vehicle telematic sensors 140, Internet of Things (IOT) 132 information. Vehicle telematics sensors 140 may monitor the vehicle 10 by using GPS 136 and onboard diagnostics to record movements on a computerized map, such as with a GPS receiver, and engine interface, an input/output interface (expander port) in the vehicle 10, a SIM card, or an accelerometer 116. The interactive vehicle safety system 100 will gather data from these inputs and the real world to help the operator see obstacles and provide the operator information to be able to react to obstacles.

The processor 105 may include a processing unit and a system memory to store and execute software instructions. The various inputs 110 and outputs 150 may be connected to the processor 105. Additionally, the processor 105 may be in communication with and connected to other various computer systems. The processor 105 of the interactive vehicle safety system 100 may have various outputs 150 after processing the various inputs 110. The outputs 150 of the interactive vehicle safety system 100 may include one or more of the following: audio spotlight 152, hologram display 154, heads-up display 156, LED display 158, display system 160, LCD display 162, dashboard display 164, haptic warning 166, audible warnings 168, image analysis 170, augmented reality display 172, external visual warnings 174, or accident prediction 176.

The processor 105 of the interactive vehicle safety system 100 may control and process various actions for the interactive vehicle safety system 100 as will be described further below. The processor 105 may be a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The one or more implementations described throughout this disclosure may utilize logical blocks, modules, and circuits that may be implemented or performed with the processor 105.

The processor 105 may be used to implement various aspects and features described herein. As such, the processor 105 may be configured to execute multiple calculations, in parallel or serial and may execute coordinate transformations, curve smoothing, noise filtering, outlier removal, amplification, and summation processes, and the like. The processor 105 may include a processing unit and system memory to store and execute software instructions. The processor 105 may be in communication with and/or connected to the interactive vehicle safety system 100 that may provide a central analysis and display.

FIGS. 7A1-7D2 illustrate the interactive vehicle safety system 100 with trajectory and dead-reckoning analysis and a heads-up display 270A along the full windshield 18. FIGS. 8A-8D illustrate the interactive vehicle safety system 100 with trajectory and dead-reckoning analysis and a heads-up display 270B along a portion of the windshield 18, and the lower left-hand portion of the windshield 18. In another embodiment of this invention, the interactive vehicle safety system 100 may include trajectory and dead reckoning analysis. For example, dead reckoning is the process of calculating a vehicle's current position and/or future position by using a previously determined position, or current position, and by using estimation of speed and course over elapsed time. The interactive vehicle safety system 100 may calculate a vehicle's future position by using a current position and by using estimation of speed, course, and other inputs over elapsed time. For collision avoidance, the reaction time may be approximately 2 seconds with a possible stopping distance of 3-5 seconds. The interactive vehicle safety system 100 may include real-time image processing for a vehicle to detect and track in real-time object movement outside the vehicle. The interactive vehicle safety system 100 may also highlight stationary or moving objects around the vehicle that are predicted to be a danger utilizing trajectory analysis and dead reckoning of the vehicle and the stationary or moving object. The trajectory analysis and dead reckoning analysis may utilize speed, direction, acceleration, turn radius, etc. from the vehicle and speed, direction, acceleration, etc. from the moving object. The prediction of the route and path of the vehicle and the location of the moving object may be calculated by the interactive vehicle safety system 100 by various methods, such as algorithms using speed, direction, turn radius, acceleration, GPS, vehicle telematic data and sensors, cameras, external sensors, mapping information, etc. Additionally, the interactive vehicle safety system 100 may include a predictive algorithm utilizing data and information to watch what pedestrians are doing, looking at the phone or wearing headphones or tracking the pedestrian's acceleration to determine if they are walking, about to run, or about to stop. The interactive vehicle safety system 100 may also utilize machine learning with the image processing to provide better predictive algorithms for the trajectory analysis.

In another embodiment of this invention, the interactive vehicle safety system 100 may include a dead-reckoning heads-up display 270 to include ultrasound sensors or other sensors to the front bumper, rear bumper, or other locations around the vehicle. As illustrated in FIGS. 7A1-7D2, the interactive vehicle safety system 100 provides a dead reckoning display 270A with information and warnings fully across the windshield and a real time picture across the windshield that can be displayed in various different colors (i.e. gray for dead reckoning and another color for real time). As illustrated in FIGS. 7A1-7D2, the heads-up display 270A may include both the vehicle/obstacles or text 274, such as "WARNING" as shown in the heads-up display 270A.

First, the interactive vehicle safety system 100 removes the A-pillar and other structural pillars to provide a clear, complete, open view to the operator of the vehicle 10. As an external, moving object's (such as a pedestrian 22) direction and speed is detected, the interactive vehicle safety system 100 displays the object and the object speed and direction both on the clear metal screen 260 but also across the windshield 18 by way of the heads-up-display 270A on the windshield 18 or dash 16. By including ultrasonic sensors on the front bumper, the rear bumper, or other locations around the vehicle, the interactive vehicle safety system 100 may then utilize real-time trajectory and object movement analysis and bring the dead reckoning into the real time space on the heads-up-display. The interactive vehicle safety system 100 may include a dead reckoning strip of LED pictures across the front of the dashboard 16 of the vehicle 10 and reflecting onto the windshield 18.

FIGS. 7A1 and 7A2 illustrate the interactive vehicle safety system 100 with trajectory and dead-reckoning analysis showing a second vehicle 20 turning left in front of a main vehicle 10. Specifically, FIG. 7A1 shows the second vehicle 20 preparing to turn left in front of the main vehicle 10. FIG. 7A2 shows the heads-up-display 270B with the second vehicle 20A turning in front of the main vehicle 10 and "WARNING" 274 by utilizing the trajectory and dead-reckoning analysis of the interactive vehicle safety system 100.

FIGS. 7B1 and 7B2 illustrate the interactive vehicle safety system 100 with trajectory and dead-reckoning analysis showing a main vehicle 10 turning left in front of a second vehicle 20. Specifically, FIG. 7B1 shows the main vehicle 10 preparing to turn left in front of the second vehicle 20. FIG. 7B2 shows the heads-up-display 270B with the main vehicle 10A turning in front of the second vehicle 20 and "WARNING" 274 by utilizing the trajectory and dead-reckoning analysis of the interactive vehicle safety system 100.

Figure 7C:
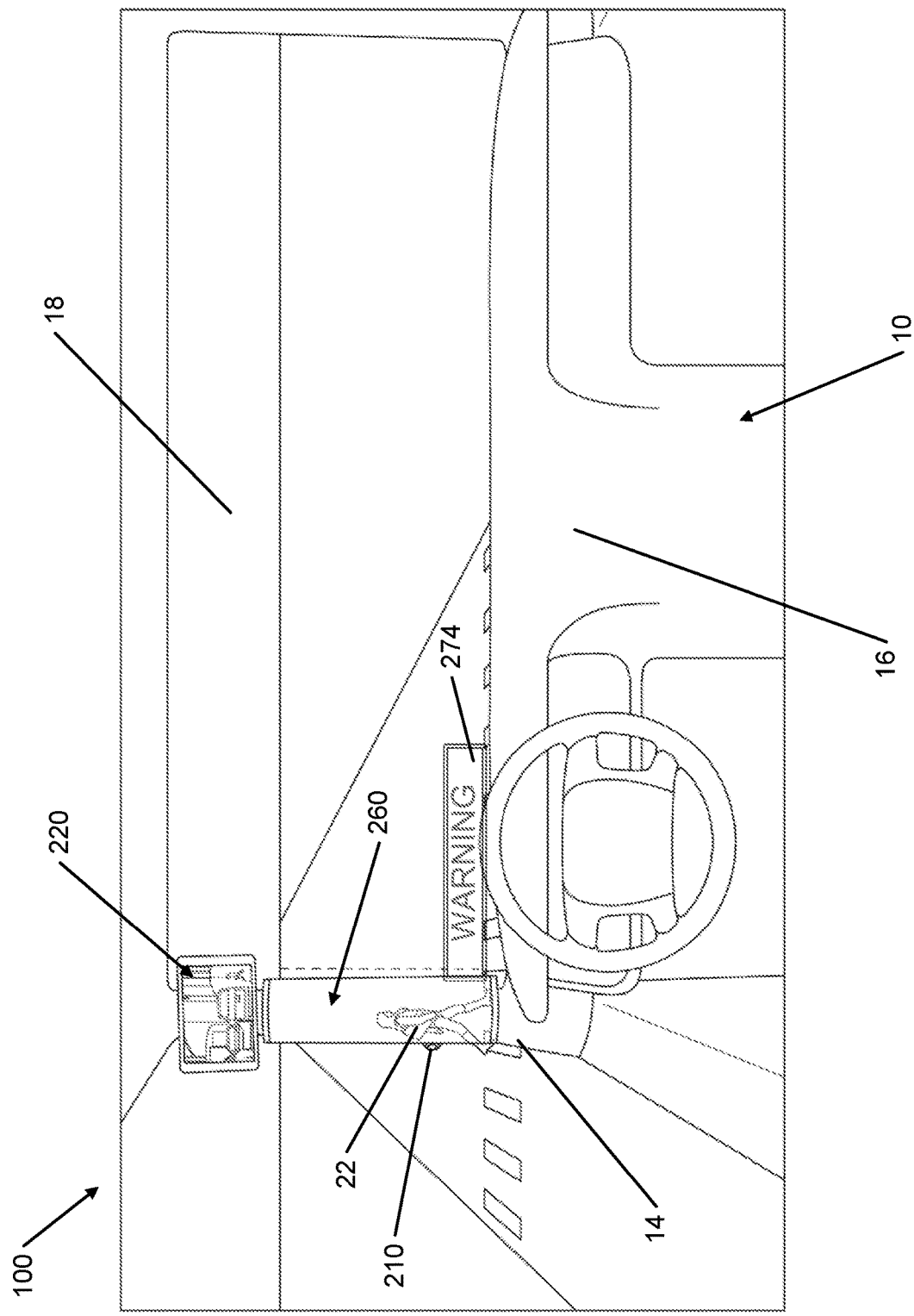
FIG. 7C illustrates an interactive vehicle safety system with trajectory and dead-reckoning analysis showing a pedestrian walking in a crosswalk in front of a main vehicle in accordance with an embodiment of the present invention.

FIG. 7C illustrates the interactive vehicle safety system 100 with trajectory and dead-reckoning analysis showing a pedestrian 22 walking in a crosswalk in front of a main vehicle 10. As illustrated in FIG. 7C, the pedestrian 22 is behind and blocked by the A-pillar 14. The operator is able to view the pedestrian 22 in the crosswalk because of the display 260 from the pillar obstruction elimination system 250. The heads-up-display 270B may display "WARNING" 274 by utilizing the trajectory and dead-reckoning analysis of the interactive vehicle safety system 100.

FIGS. 7D1 and 7D2 illustrate the interactive vehicle safety system 100 with trajectory and dead-reckoning analysis showing a main vehicle 10 turning left in front of a pedestrian 20 in a crosswalk. Specifically, FIG. 7D1 shows the main vehicle 10 preparing to turn left in the direction of the pedestrian 22 in the crosswalk. FIG. 7D2 shows the heads-up-display 270B with the main vehicle 10A turning towards the pedestrian 22 in the crosswalk along with "WARNING" 274 by utilizing the trajectory and dead-reckoning analysis of the interactive vehicle safety system 100.

Figure 8A:
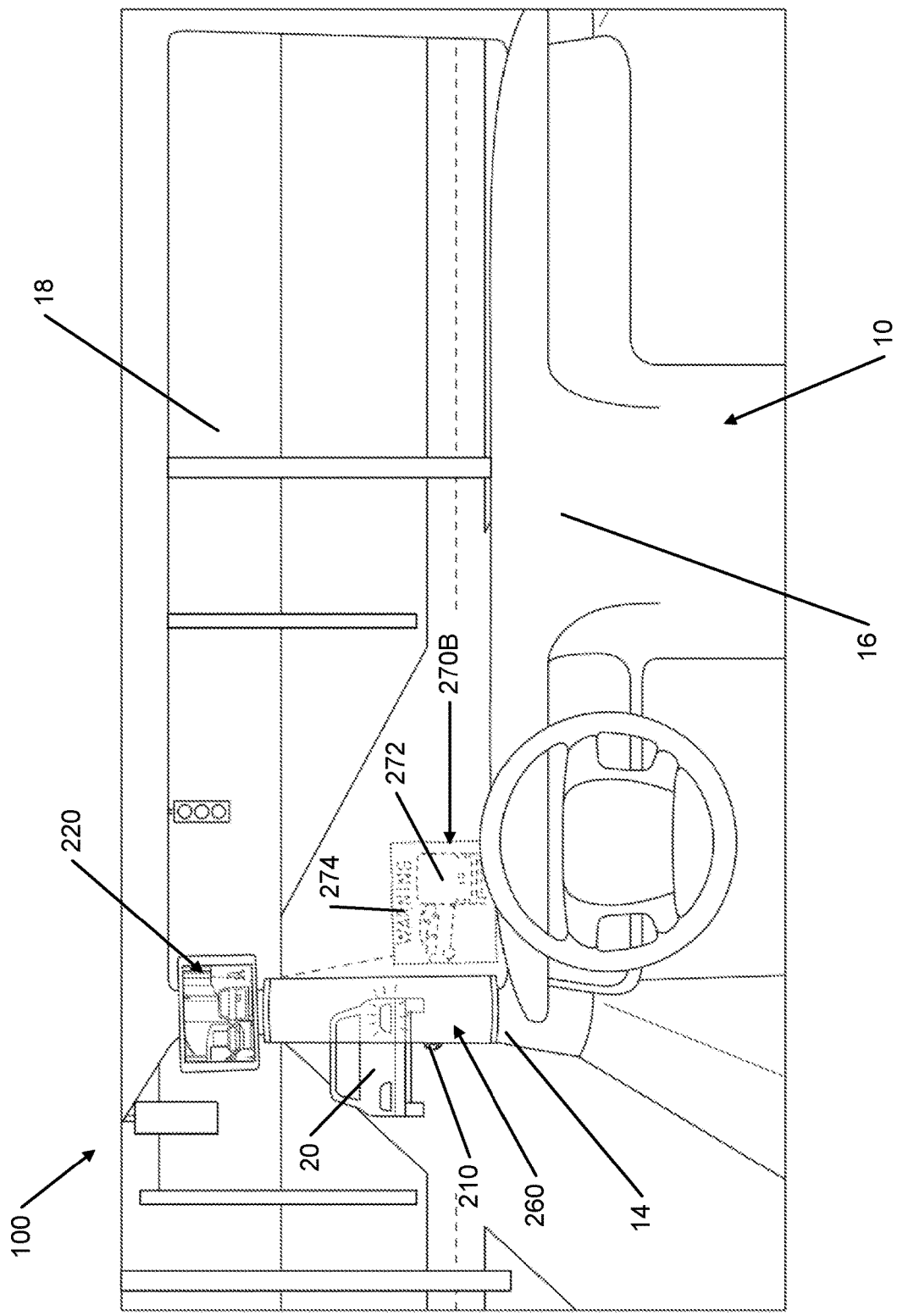
FIG. 8A illustrates the interactive vehicle safety system from FIGS. 7A1 and 7A2 with a heads-up-display (HUD) in accordance with an embodiment of the present invention.
Figure 8B:
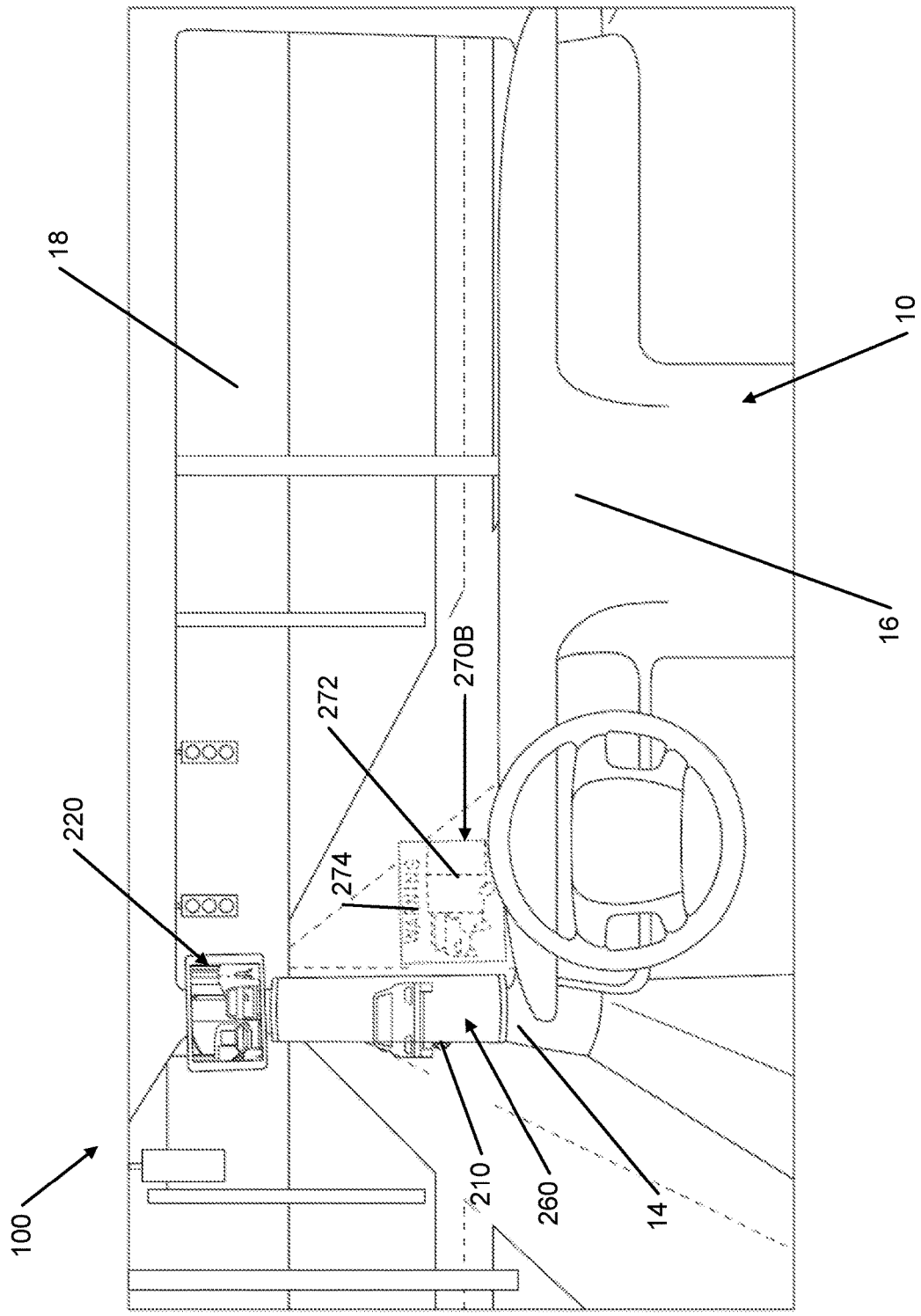
FIG. 8B illustrates the interactive vehicle safety system from FIGS. 7B1 and 7B2 with a heads-up-display (HUD) in accordance with an embodiment of the present invention.
Figure 8C:
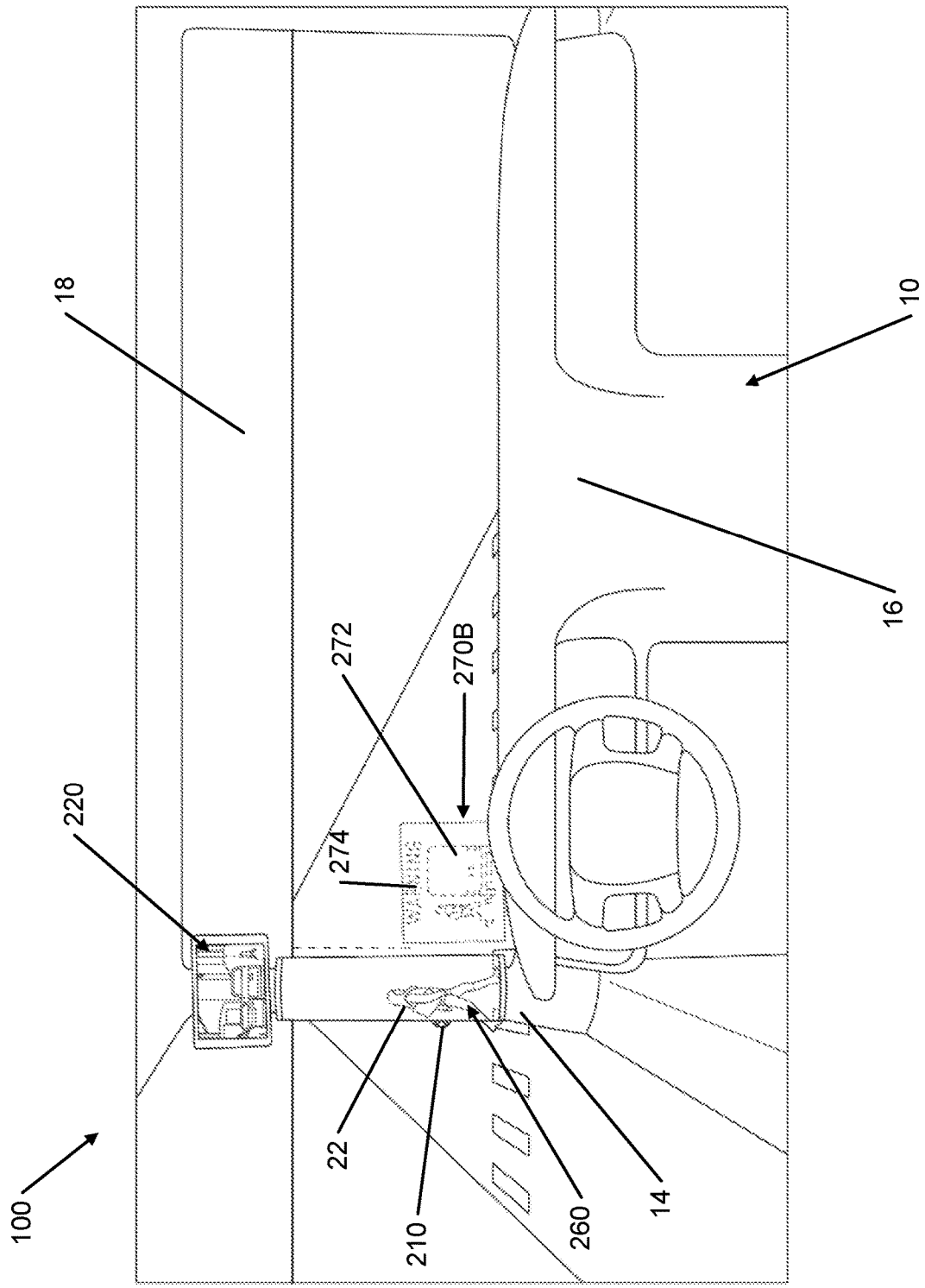
FIG. 8C illustrates the interactive vehicle safety system from FIG. 7C with a heads-up-display (HUD) in accordance with an embodiment of the present invention.
Figure 8D:
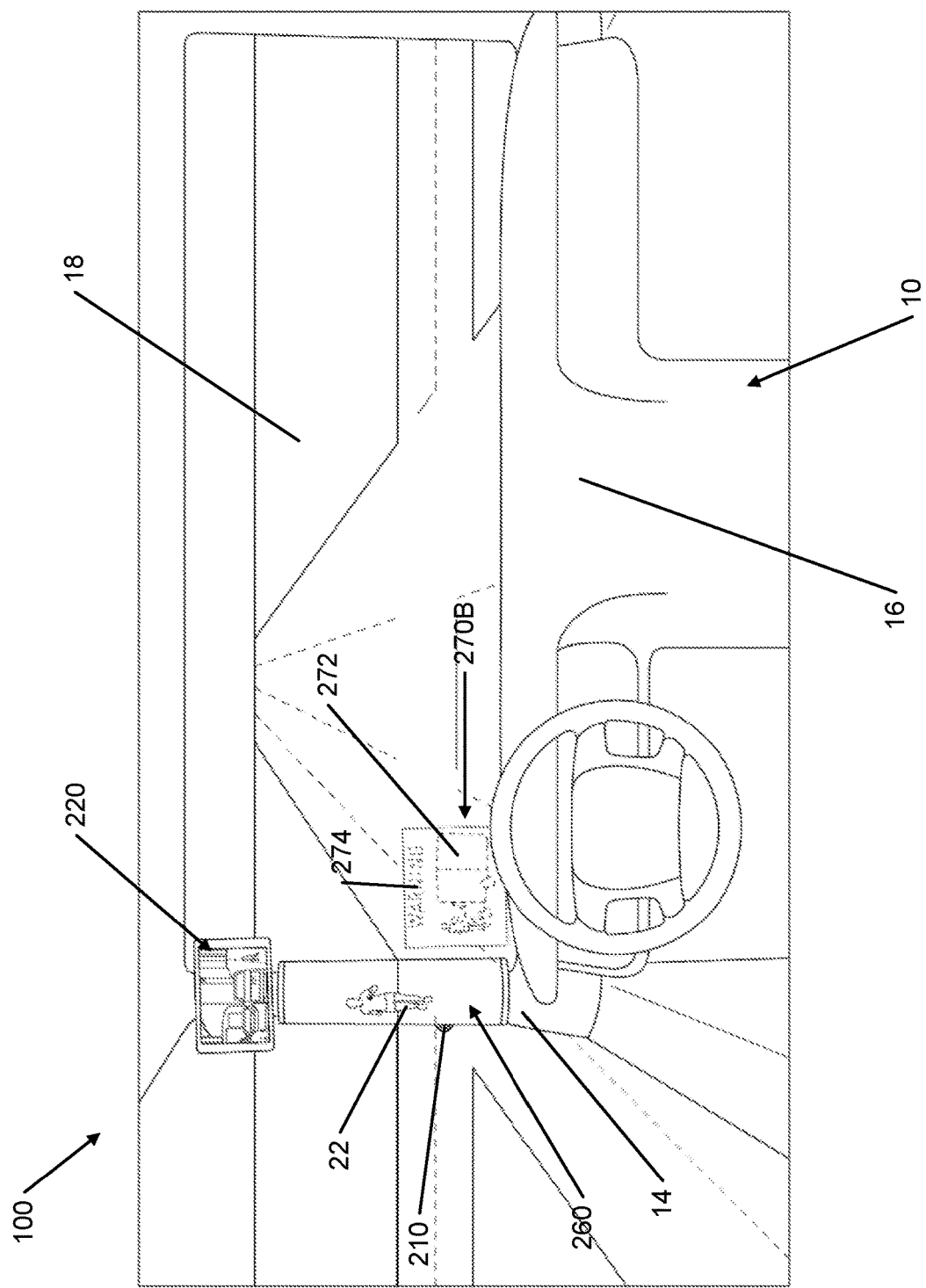
FIG. 8D illustrates the interactive vehicle safety system from FIGS. 7D1 and 7D2 with a heads-up-display (HUD) in accordance with an embodiment of the present invention.

FIGS. 8A-8D illustrate the interactive vehicle safety system 100 with trajectory and dead-reckoning analysis and a heads-up display 270B along a portion of the windshield 18, and the lower left-hand portion of the windshield 18. As illustrated in FIGS. 8A-8D, the heads-up display 270B (along with the heads-up display 270A) may include both the vehicle/obstacles 272 or text 274, such as "WARNING" as shown in the heads-up display 270B. Specifically, FIG. 8A illustrates the interactive vehicle safety system 100 with the heads-up-display (HUD) 270B in the lower left-hand portion of the windshield 18 showing a second vehicle 20 turning left in front of a main vehicle 10. FIG. 8B illustrates the interactive vehicle safety system 100 with a heads-up-display (HUD) 270B in the lower left-hand portion of the windshield 18 showing a main vehicle 10 turning left in front of a second vehicle 20. FIG. 8C illustrates the interactive vehicle safety system 100 with a heads-up-display (HUD) 270B in the lower left-hand portion of the windshield 18 showing a pedestrian 22 walking in a crosswalk in front of a main vehicle 10. FIG. 8D illustrates the interactive vehicle safety system 100 with a heads-up-display (HUD) 270B in the lower left-hand portion of the windshield 18 showing a main vehicle 10 turning left in front of a pedestrian 22 in a crosswalk.

The highlighting of the moving object in danger may be highlighted in various stages. For example, the moving object may be highlighted yellow if the object is potentially in the path of accident or collision with the vehicle. In addition, the moving object may be highlighted red if the object is moving and imminently in the path of accident or collision with the vehicle. Highlighting may be in the form of different colors, blinking colors, circles around the object, blinking circles, etc, without departing from this invention.

Figure 9:
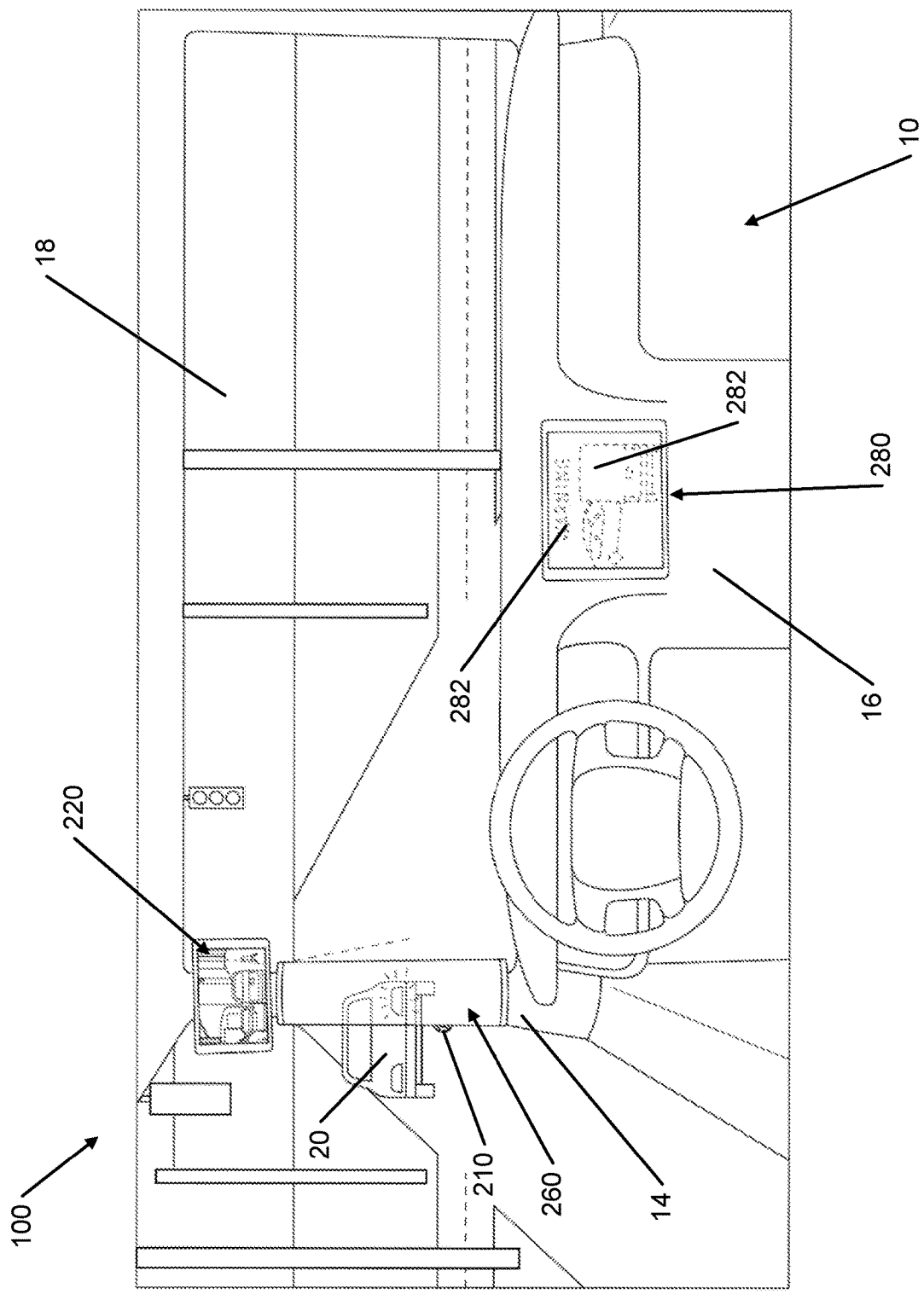
FIG. 9 illustrates an interactive vehicle safety system with a display in the dashboard in accordance with an embodiment of the present invention.

The interactive vehicle safety system 100 may utilize the heads-up display 270 as described and illustrated previously or the interactive vehicle safety system 100 may utilize a dashboard display 280. FIG. 9 illustrates an exemplary dashboard display 280 located on the dashboard 16 of the vehicle 10. The dashboard display 280 may include both the vehicle/obstacles 282 or text 284, such as "WARNING" as shown in the dashboard display 280. The interactive vehicle safety system 100 may utilize any one of or any combination of the heads-up display 270A, the heads-up display 270B, or the dashboard display 280 without departing from this invention to display what is happening outside the vehicle or what might happen outside the vehicle.

In another embodiment of this invention, the interactive vehicle safety system 100 may provide a full vision of what is happening outside of the vehicle 10. For example, the interactive vehicle safety system 100 will provide and improve an operator's peripheral visual awareness to provide situational awareness to the operator. The interactive vehicle safety system 100 may utilize one or more of the following systems and information to provide and improve the operator's peripheral visual awareness. For example, the interactive vehicle safety system 100 may provide an augmented reality system. The interactive vehicle safety system 100 may also provide depth cameras or other system that provide depth imagery allowing the ability to change the perspective of the operator's view. For example, the augmented reality system and/or the depth cameras may provide a display with the driver's perspective "in front" of the vehicle or with the driver's perspective "on top" of the vehicle. Depth cameras may also not return colors and may return a grey-scale image to help determine depth and therefore the distance of a pedestrian, object, or other danger object in the path of the vehicle.

In another embodiment of the invention, the operator may also utilize glasses, contacts, or a circular plastic cover that drops over the face and eyes to provide an augmented reality vision of the full vision of what is happening outside of the vehicle. The cover may drop over the face and eyes of the operator when required or when initiated by the interactive vehicle safety system 100. The augmented reality system may initiate the movement of the cover based on a projected trajectory of a collision and/or accident. The augmented reality system may initiate the movement of the cover upon movement of the vehicle.

In another embodiment of this invention, the interactive vehicle safety system 100 may utilize various sensors to provide the operator and system with additional information and situational awareness. The various sensors may include one or more of the following sensors: density, vibration, audio, humidity, air pressure, color, synthetic sensors, etc. The various sensors may be located on the front bumper, rear bumper, or other locations around the vehicle. The one or more sensors may include trajectory sensors to help determine and provide data and analysis of the trajectory and dead reckoning of the vehicle and any moving objects external to the vehicle. The one or more sensors may also include synthetic sensors wherein one sensor senses an action and the other sensors as part of the synthetic sensor confirms that action.

In another embodiment of this invention, the interactive vehicle safety system 100 may utilize stereoscopy with the plurality of cameras. The plurality of cameras may be located throughout the exterior of the vehicle, such as in front, sides, back, top, or bottom of the vehicle. The stereoscopy may utilize two or more cameras to accurately determine depth, location, and trajectory of moving objects or pedestrians external to the vehicle.

In another embodiment of this invention, the interactive vehicle safety system 100 may determine and track the location of the operator's head to change the view for the operator's view based on the operator's head location when moving, rotating, or at different heights. Tracking the operator's head location will help maintain aspect ratio location of the operator's vision of the display and external from the interactive vehicle safety system 100.

In another embodiment of this invention, the interactive vehicle safety system 100 may integrate data from various other information sources. The plurality of information sources may be one or more information sources on the Internet of Things (IOT), such as from camera information from intersections, buildings, autonomous vehicles, or other camera sources, sensors, or measuring devices throughout the area.

In another embodiment of this invention, the interactive vehicle safety system 100 may include image analysis with cameras that can detection what a pedestrian is doing. For example, image analysis may detect earbuds and/or headphones or a pedestrian talking on a cell phone. The interactive vehicle safety system 100 may utilize this image analysis information to potentially take a different action.

Figure 10:
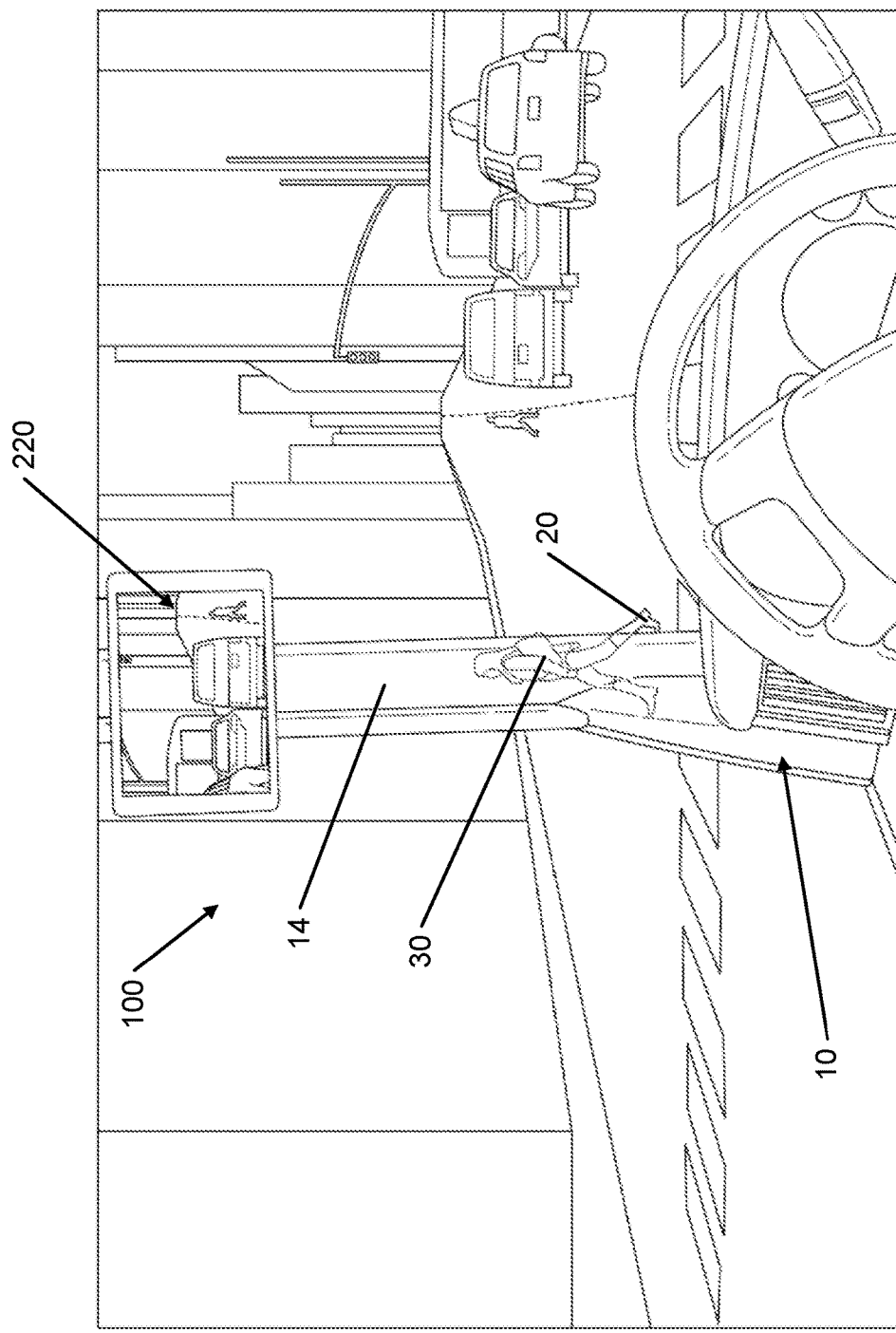
FIG. 10 illustrates an interactive vehicle safety system using hologram technology in accordance with an embodiment of the present invention.

In another embodiment of this invention illustrated in FIG. 10, the interactive vehicle safety system 100 may utilize hologram technology with motion parallax. As illustrated in FIG. 10, the hologram system may provide a hologram 30 on the pillar 14 of the pedestrian 22 located behind the pillar 14. For example, as the operator moves eye direction, the foreground may shift faster than the background and create a stereoscopic view. The hologram technology may utilize a laser, one or more beam splitter mirrors (such as two mirrors), one or more lens (such as three lens), and a holograph film located on the pillar 14 or other location within the vehicle 10. By using a laser light, the light may be in the same direction and same wavelength to provide coherent beams with all light waves in phase to project the hologram 30 or 3D version of what is happening outside and blocked by the driver's vision.

In another embodiment of this invention, the interactive vehicle safety system 100 may provide audible and/or visual warnings to pedestrians and/or other danger objects. For example, the interactive vehicle safety system 100 may provide audible, visual, and other warnings (such as sounds, visual, and/or motion—such as a vibrating seat) to both the pedestrians and the vehicle operator when collision, an accident, or danger is possible. The interactive vehicle safety system 100 may utilize a transducer or other systems to send directed audible warnings to the danger pedestrian, such as 3D sounds.

Figure 11:
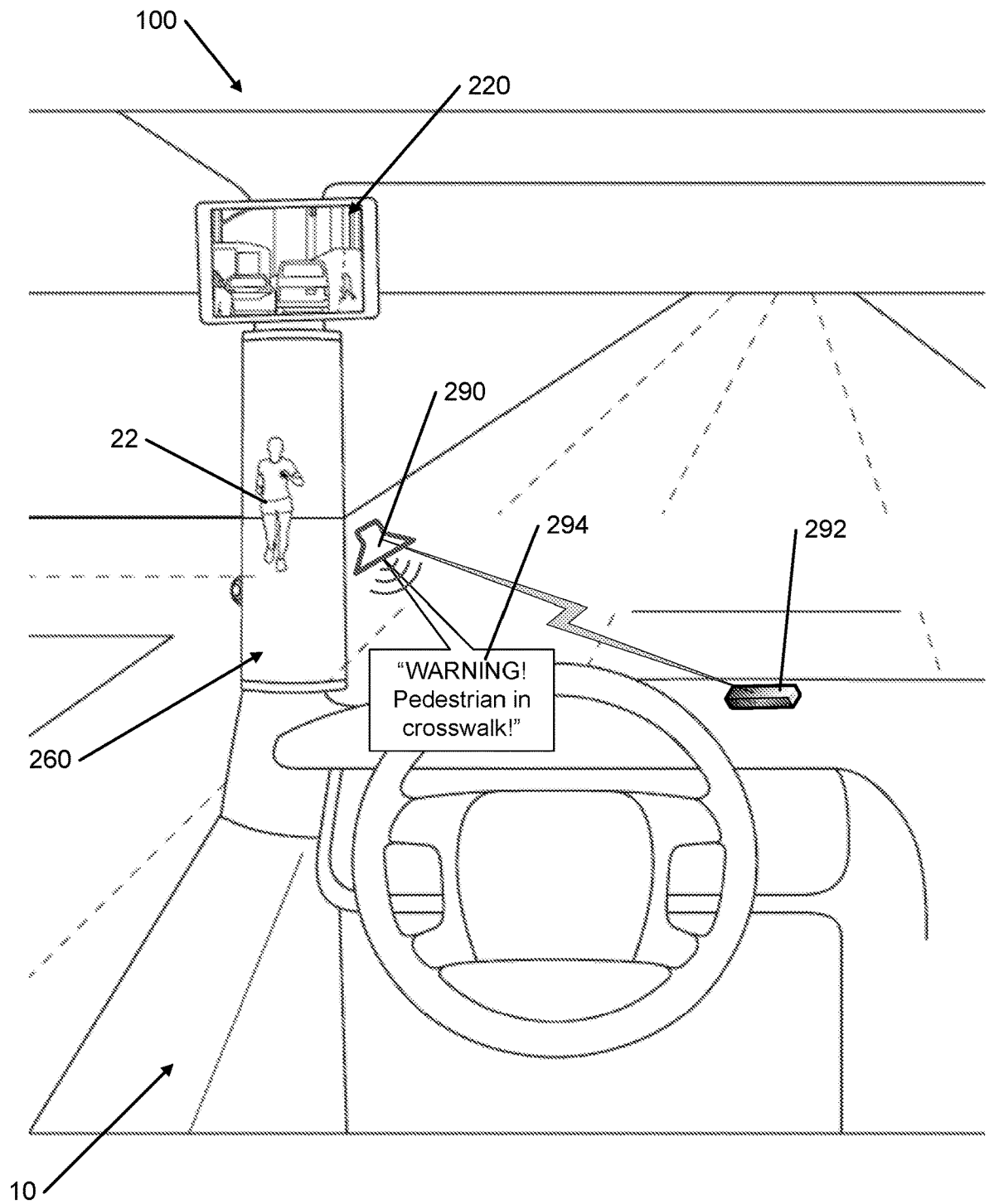
FIG. 11 illustrates an interactive vehicle safety system using audio spotlight technology in accordance with an embodiment of the present invention.

In another embodiment of this invention as illustrated in FIG. 11, the interactive vehicle safety system 100 may provide an audio "spotlight" 290 for the operator. In this embodiment, an aimed audio device 292 located on the vehicle 10 casts the audio "spotlight" 290 to a surface redirecting the source/sound and pointed specifically at that spot, such as the sound coming from that spot. This allows the interactive vehicle safety system 100 to provide an audible warning 294 to the operator coming from the location of a potential accident or collision location based on the trajectory analysis, sensors, and cameras with the interactive vehicle safety system 100.

In another embodiment of this invention, the interactive vehicle safety system 100 may provide other warnings to the operator and/or pedestrians. For example, the interactive vehicle safety system 100 may provide a vibrating seat or haptic warning to the operator when a potential collision or accident is detected. In another example, the interactive vehicle safety system 100 may provide external, automatic, audible warnings outside of the vehicle, such as, "Warning—Vehicle approaching" or "Warning—Vehicle turning." The interactive vehicle safety system 100 may provide internal, automatic, audible warnings inside of the vehicle to the operator, such as, "Warning—Pedestrian in crosswalk." The interactive vehicle safety system 100 may also include an audio system with "white" noise or nuisance noise, ambient noise sensor to change external sounds, or GPS geofencing.

Figure 12:
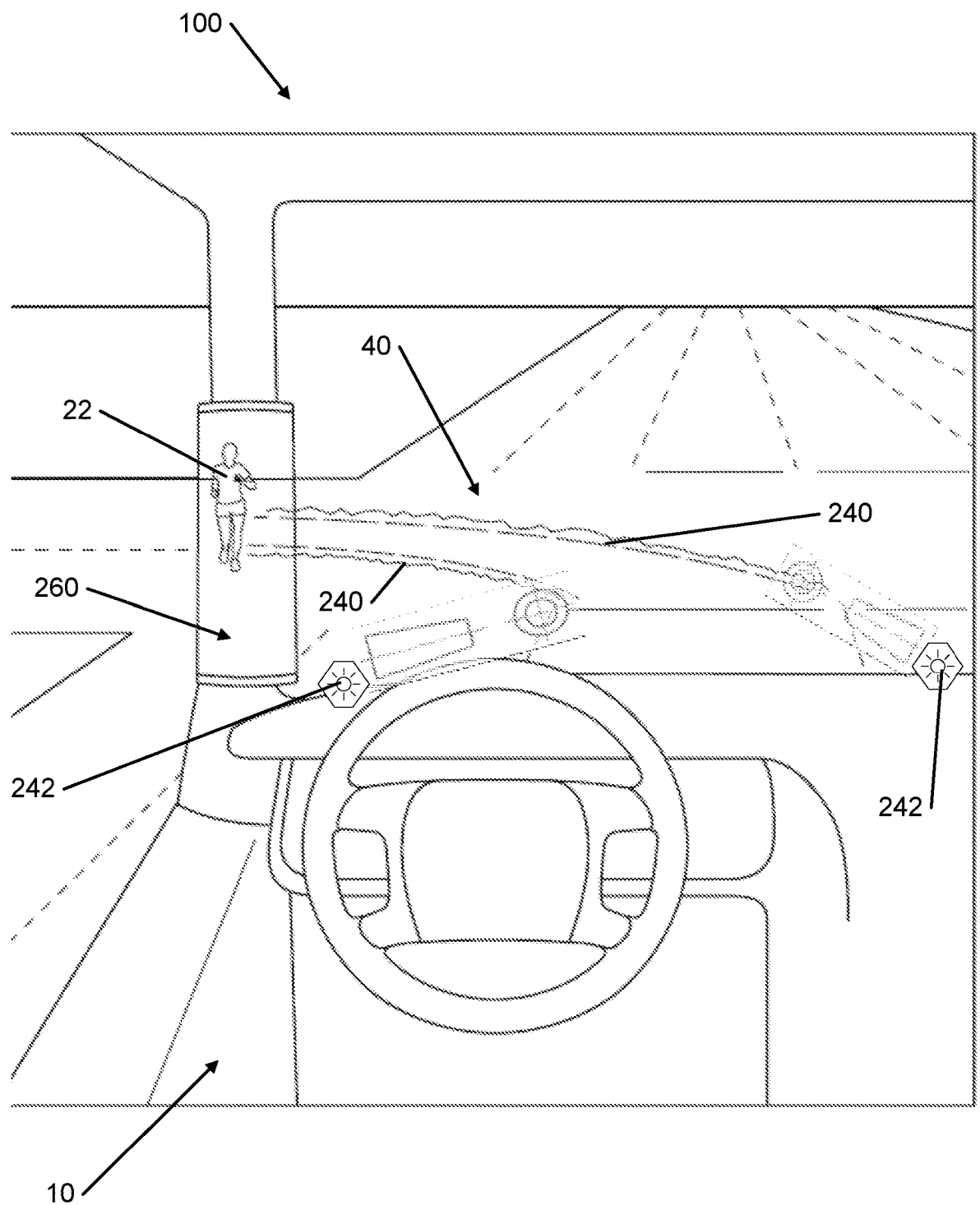
FIG. 12 illustrates an interactive vehicle safety system using an external highlighting technology in accordance with an embodiment of the present invention.

In another embodiment of this invention, the interactive vehicle safety system 100 may include a highlighting feature 240 on the display or on the external area 40 when the vehicle is making a turn. For example, as was described above, the interactive vehicle safety system 100 may display the path of the turn on the display for the operator based on the trajectory analysis, sensors, and cameras with the interactive vehicle safety system 100. Additionally, as illustrated in FIG. 12, the interactive vehicle safety system 100 may externally, outside of the vehicle 12, light up the external path 240 on the pavement or external area 40 of where the vehicle 10 is going, such as the trajectory of going straight or a turn during the turn. For example, the interactive vehicle safety system 100 may laser the path 240 and the direction of the vehicle 10 on the street or pavement 40—painting a turn or going straight with high-intensity LED lights 242 or similar lighting elements. To assist with optically displaying the path 240 externally on the street or pavement 40, the interactive vehicle safety system 100 may also provide infrared and heat-detection sensors to help "block-out" the road to display the external projected path of the vehicle on the road.

The interactive vehicle safety system 100 may include optical sensors on a steering wheel for determining a turning radius of a turn and providing predictive modeling on the turning path of the vehicle. Additionally, the interactive vehicle safety system 100 may include sensors on the wheels of the vehicle, such as an electromagnetic arm or pitmen arm for determining a predictive analysis of the turning radius of the vehicle. Additionally, back-up cameras or front cameras may provide additional turning trajectory analysis and path projection of the vehicle.

In another embodiment of this invention, the interactive vehicle safety system 100 may provide visual information and visual warnings. The visual warning may include a strobe or laser directed specific to a "danger" pedestrian to alert the pedestrian of an oncoming, turning vehicle. Additionally, the interactive vehicle safety system 100 may include a heads-up-display (HUD) on the windshield or other location based on the various cameras and sensors associated with the interactive vehicle safety system 100. The heads-up-display may include any of the information as described to include information about various moving objects and stationary objects from the trajectory analysis determined as potential collision or accident. The heads-up-display may include a distance or how many feet or inches an object is away from the vehicle and/or collision. The heads-up-display may also include a time to collision based on the trajectory analysis of the vehicle and the moving object.

In another embodiment of this invention, the interactive vehicle safety system 100 may include a processor and database for recording and storing information and images from turns and actions based on "danger" present or imminent—critical moments. The critical moments may be determined by geofencing, accelerometer analysis, and impact detection. The interactive vehicle safety system 100 may create a 3D model from the cameras and sensors to recreate an accident. This information can be very helpful in a number of situations as providing evidence of the actual actions that occurred during these critical moments.

In another embodiment of this invention, the interactive vehicle safety system 100 may include a number of automatic actions in response to an imminent or present danger situation. For example, the interactive vehicle safety system 100 may automatically stop acceleration of the vehicle at a "yellow" condition for a collision or accident. In another example, the interactive vehicle safety system 100 may automatically apply the brakes on the vehicle at a "red" condition for a collision or accident. The "yellow" and "red" conditions may be set by parameters within the interactive vehicle safety system 100. The interactive vehicle safety system 100 may require the vehicle to maintain within the speed limit, utilizing GPS-location services or even a camera that recognizes the speed limit through image analysis. In another example, the interactive vehicle safety system 100 may utilize other automatic actions, such as: preemptive braking, changing steering direction, horn honking, flashing lights, or vibration in the seats to help assist with maintain vehicle safety.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

We claim:

1. An interactive safety system for a vehicle comprising:
   one or more processors;
   one or more image capturing devices located on the vehicle and configured to transmit one or more images to the one or more processors;
   one or more object detecting sensors located on the vehicle and configured to detect location, speed, and/or direction of one or more objects external to the vehicle, wherein the one or more object detecting sensors are configured to transmit location, speed, and/or direction data to the one or more processors; and
   a memory unit configured to store computer-executable instructions that, when executed by the one or more processors, cause the one or more processors to:
   receive at least one image from the one or more image capturing devices;
   receive location, speed, and/or direction data for one or more objects external to the vehicle from the one or more object detecting sensors;
   determine that an object of the one more objects represents a potential collision with the vehicle based on the at least one image and/or the location, speed, and/or direction data; and
   provide an audible warning to an operator of the vehicle from a direction of the object relative to the vehicle based on the determination that the object represents a potential collision with the vehicle, wherein the audible warning is provided via an aimed audio device connected to the one or more processors that casts a sound to a surface redirecting the sound to come from the direction of the object relative to the vehicle.

2. The interactive safety system of claim 1, wherein to determine that the object represents a potential collision, the computer-executable instructions cause the one or more processors to:
   process in real-time the at least one image and the location, speed, and/or direction data of the one or more objects external to the vehicle; and
   predict a future location and/or a route of the one or more objects using a predictive algorithm and trajectory analysis, wherein the one or more processors determine that the object represents a potential collision based on the predictive algorithm and trajectory analysis.

3. The interactive safety system of claim 1, wherein the interactive safety system further comprises a display system connected to the one or more processors, wherein the display system comprises a heads-up display on a windshield of the vehicle and/or a dashboard display on a dashboard of the vehicle.

4. The interactive safety system of claim 3, wherein the computer-executable instructions cause the one or more processors to:
   display, via the display system, the one or more objects external to the vehicle with location, speed, and/or direction data for the one or more objects.

5. The interactive safety system of claim 3, wherein the computer-executable instructions cause the one or more processors to:
   display, via the display system, the object representing a potential collision, a predicted future location of the object representing a potential collision, and/or a predicted route of the object representing a potential collision on the heads-up display and/or the dashboard display.

6. The interactive safety system of claim 5, wherein the computer-executable instructions cause the one or more processors to highlight the object representing a potential collision on the display system.

7. The interactive safety system of claim 6, wherein the object is highlighted a first color if the object is potentially in a path of an accident or a collision with the vehicle, and wherein the object is highlighted a second color if the object is imminently in a path of an accident or a collision with the vehicle.

8. The interactive safety system of claim 6, wherein highlighting the object representing a potential collision includes one or more of the following: blinking colors on the object, circling the object, or blinking circles around the object.

9. The interactive safety system of claim 1, wherein the interactive safety system further comprises a pillar display located in the vehicle on an A-pillar of the vehicle and configured to portray an image captured by the one or more image capturing devices that is blocked from view by the A-pillar.

10. The interactive safety system of claim 9 wherein the computer-executable instructions cause the one or more processors to:
    display the image blocked from view by the A-pillar on the pillar display.

11. The interactive safety system of claim 1, wherein the interactive safety system further comprises a rear-view display located in the vehicle and configured to portray an image from the one or more image capturing devices that would be seen in a rear-view mirror, wherein the computer-executable instructions cause the one or more processors to:
    display the image that would be seen in the rear-view mirror on the rear-view display.

12. The interactive safety system of claim 1, wherein the computer-executable instructions further cause the one or more processors to:
    provide a visual warning to the object representing a potential collision, wherein the visual warning is provided external to the vehicle.

13. The interactive safety system of claim 1, wherein the computer-executable instructions further cause the one or more processors to:
    light a path of the vehicle with high-intensity lights, wherein the path is visible externally to the vehicle.

14. The interactive safety system of claim 1, wherein the computer-executable instructions further cause the one or more processors to:

provide an audible warning to the object representing a potential collision, wherein the audible warning is provided externally to the vehicle.

15. The interactive safety system of claim 14, wherein the audible warning is a 3D sound directed toward the object representing a potential collision.

16. The interactive safety system of claim 14, wherein audible warning is an audio spotlight.

17. The interactive safety system of claim 1, wherein the one or more object detecting sensors comprise one or more ultrasonic sensors, one or more LIDAR radar sensors, and/or one or more photoelectric sensors.

18. The interactive safety system of claim 1, wherein the computer-executable instructions further cause the one or more processors to:
track in real-time the one or more objects external to the vehicle based on the at least one image and the location, speed, and/or direction data of the one or more objects.

19. The interactive safety system of claim 1, wherein the interactive safety system further comprises one or more telematics devices configured to transmit vehicle telematics data from the vehicle to the one or more processors, wherein the computer-executable instructions further cause the one or more processors to:
receive the telematics data from the telematics device; and
process in real-time the telematics data, wherein the one or more processors are further configured to determine that the object represents a potential collision with the vehicle based on the telematics data.

20. The interactive safety system of claim 1, wherein the vehicle comprises an automobile, a truck, a train, a bicycle, a motorcycle, or a forklift.

* * * * *